(12) United States Patent
Maeda

(10) Patent No.: US 11,493,359 B2
(45) Date of Patent: Nov. 8, 2022

(54) CONTROL DEVICE, CONTROL METHOD, AND MOBILE OBJECT

(71) Applicant: SONY CORPORATION, Tokyo (JP)

(72) Inventor: Keisuke Maeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 32 days.

(21) Appl. No.: 16/961,002

(22) PCT Filed: Jan. 10, 2019

(86) PCT No.: PCT/JP2019/000433
§ 371 (c)(1),
(2) Date: Jul. 9, 2020

(87) PCT Pub. No.: WO2019/146407
PCT Pub. Date: Aug. 1, 2019

(65) Prior Publication Data
US 2020/0348147 A1     Nov. 5, 2020

(30) Foreign Application Priority Data
Jan. 24, 2018 (JP) .............................. JP2018-009472

(51) Int. Cl.
*G06F 3/048* (2013.01)
*G01C 21/36* (2006.01)
*G06F 3/0482* (2013.01)

(52) U.S. Cl.
CPC ........ *G01C 21/3691* (2013.01); *G06F 3/0482* (2013.01)

(58) Field of Classification Search
CPC .......................... G01C 21/3691; G06F 3/0482
See application file for complete search history.

(56) References Cited

U.S. PATENT DOCUMENTS

| 10,107,641 B2* | 10/2018 | Zhou ................. G01C 21/3605 |
| 10,584,978 B2* | 3/2020 | LeBlanc .......... G08G 1/096811 |
| 11,087,291 B2* | 8/2021 | Onimaru .............. G08G 1/0145 |
| 2008/0071465 A1* | 3/2008 | Chapman ........... G01C 21/3691 701/117 |

(Continued)

FOREIGN PATENT DOCUMENTS

| JP | 09-139686 A | 5/1997 |
| JP | 10-143243 A | 5/1998 |

(Continued)

OTHER PUBLICATIONS

International Search Report and Written Opinion of PCT Application No. PCT/JP2019/000433, dated Apr. 9, 2019, 11 pages of ISRWO.

*Primary Examiner* — David Phantana-angkool
(74) *Attorney, Agent, or Firm* — Chip Law Group

(57) ABSTRACT

The present disclosure relates to a control device, a control method, and a mobile object that effectively use storage capacity while saving the storage capacity and efficiently plan a movement route by storing or forgetting (deleting) a past detailed map according to importance during autonomous movement. When a global route is set, by storing or forgetting (deleting) a detailed map according to the importance on the global route to plan a local route from a frequently used global route, it is possible to efficiently plan a local route by combining detailed maps stored in the past.

16 Claims, 29 Drawing Sheets

(56) References Cited

U.S. PATENT DOCUMENTS

| | | | | |
|---|---|---|---|---|
| 2015/0253144 A1* | 9/2015 | Rau | .................... | G01C 21/3484 |
| | | | | 705/348 |
| 2016/0123761 A1* | 5/2016 | Van Wieringen | .. | G01C 21/3415 |
| | | | | 701/465 |
| 2016/0290819 A1* | 10/2016 | Kalyanaraman | ....... | B60Q 1/346 |
| 2016/0335139 A1* | 11/2016 | Hurley | ................ | G06F 3/04842 |
| 2016/0356602 A1* | 12/2016 | Puana | ................ | G01C 21/3673 |
| 2018/0128636 A1* | 5/2018 | Zhou | ................ | G01C 21/3697 |
| 2021/0347382 A1* | 11/2021 | Huang | ................ | G05D 1/0217 |

FOREIGN PATENT DOCUMENTS

| | | |
|---|---|---|
| JP | 2004-233220 A | 8/2004 |
| JP | 2006-017504 A | 1/2006 |
| JP | 2009-163156 A | 7/2009 |
| JP | 2011-117740 A | 6/2011 |
| JP | 2013-033356 A | 2/2013 |
| JP | 2016-149090 A | 8/2016 |
| WO | 2011/065522 A1 | 6/2011 |

\* cited by examiner

*FIG. 6*

```
MAIN POINT LIST
 - name: HOME
   address: 1-1-1, SHINAGAWA, TOKYO
   type: USER INPUT
   time: 20180110
 - name: CITY OSAKI
   address: 2-10-1, OSAKI, SHINAGAWA, TOKYO
   type: AUTOMATIC CREATION
   time: 20171030
```
~211

```
MAIN POINT CANDIDATE LIST
 - name: SHINAGAWA STATION
   address: 3, TAKANAWA, MINATO, TOKYO
   score: 3
   time: 20171101
 - name: NURSERY SCHOOL
   address: 1-1-1, OSAKI, SHINAGAWA, TOKYO
   score: 14
   time: 20171015
```
~212

```
LONG-TERM IMPORTANT AREA LIST
 - road_id: 0
   time: 20171121
 - road_id: 3
   time: 20171201
 - road_id: 4
   time: 20171225
 . . .
```
~213

```
LONG-TERM IMPORTANT AREA CANDIDATE LIST
 - road_id: 5
   score: 3
   time: 20171111
 - road_id: 8
   score: 14
   time: 20171221
 . . .
```
~214

```
SHORT-TERM IMPORTANT AREA LIST
 - road_id: 0
   time: 20171010
 - road_id: 5
   time: 20171113
 - road_id: 18
   time: 20171201
 . . .
```
~221

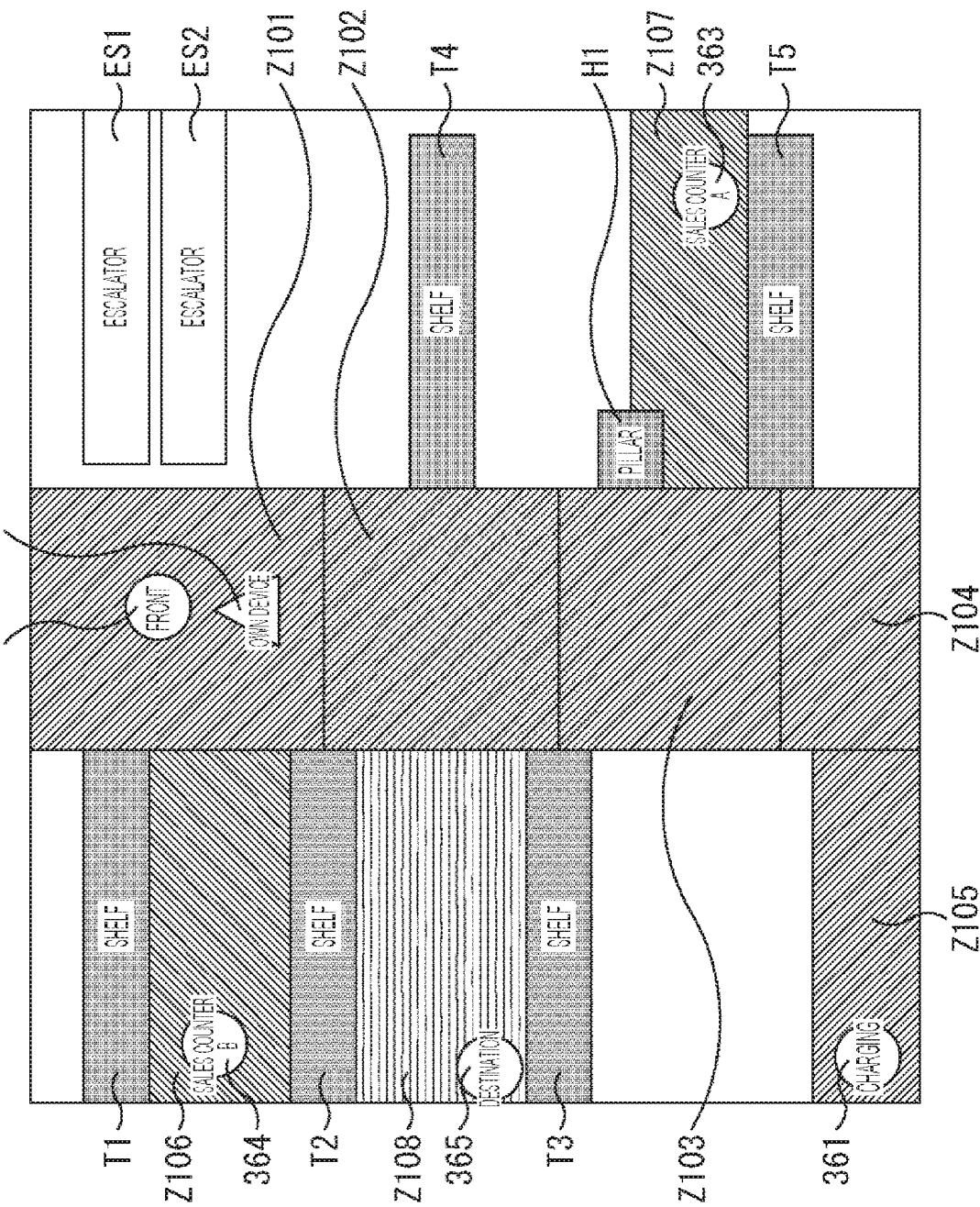

*FIG. 8*

```
MAIN POINT LIST
- name: CHARGING STATION
  address: (x:0.5, y:0.5)
  type: USER INPUT
  time: 20180110
- name: IN FRONT OF ESCALATOR
  address: (x:5.0, y:8.0)
  type: AUTOMATIC CREATION
  time: 20171030
```
~211

```
MAIN-POINT CANDIDATE LIST
- name: SALES COUNTER A
  address: (x:9.0, y:2.0)
  score: 3
  time: 20171101
- name: SALES COUNTER B
  address: (x:1.0, y:7.5)
  score: 14
  time: 20171015
```
~212

```
LONG-TERM IMPORTANT AREA LIST
- area_id: 0
  time: 20171121
- area_id: 3
  time: 20171201
- area_id: 4
  time: 20171225
...
```
~213

```
LONG-TERM IMPORTANT AREA CANDIDATE LIST
- area_id: 5
  score: 3
  time: 20171111
- area_id: 8
  score: 14
  time: 20171221
...
```
~214

```
SHORT-TERM IMPORTANT AREA LIST
- area_id: 0
  time: 20171010
- area_id: 5
  time: 20171113
- area_id: 18
  time: 20171201
...
```
~221

FIG. 10

```
MAIN POINT LIST
- name: CHARGING STATION
  address: (x:5.0, y:0.5)
  type: USER INPUT
  time: 20180110
- name: ENTRANCE HALL
  address: (x:5.0, y:9.0)
  type: USER INPUT
  time: 20171030
```
~211

```
MAIN-POINT CANDIDATE LIST
- name: IN FRONT OF DESK
  address: (x:6.0, y:1.0)
  score: 16
  time: 20171101
```
~212

```
LONG-TERM IMPORTANT AREA LIST
- area_id: 0
  time: 20171121
- area_id: 3
  time: 20171201
...
```
~213

```
LONG-TERM IMPORTANT AREA CANDIDATE LIST
- area_id: 4
  score: 8
  time: 20171111
...
```
~214

```
SHORT-TERM IMPORTANT AREA LIST
- area_id: 5
  time: 20171010
...
```
~221

FIG. 11

| | | RETENTION TARGET | RETENTION PERIOD | RETENTION FORMAT | ASSUMED TARGET |
|---|---|---|---|---|---|
| SELF-DRIVING CAR | | MAP | ∞ | MAPS IN GENERAL | PRIVATE LAND (WITHOUT MAP) |
| | | AREA WHERE CAR CAN BE PARKED | n HOURS | GRID MAP | PARKING LOT |
| | | NON-PASSABLE LANE | 24 HOURS | LANE | CONSTRUCTION / ACCIDENT / PEDESTRIAN ZONE |
| | | STATIONARY OBSTACLE / NON-PASSABLE AREA | 24 HOURS | PRISMATIC MAP | PARKED VEHICLE / CONSTRUCTION / ACCIDENT / SCATTERED CARGO / ENTRANCE / EXIT OF CONSTRUCTION VEHICLE / STREET STALL / STAND |
| | | CONGESTION SITUATION | 1 HOUR | LANE | CONGESTION |
| HOME ROBOT | | MAP | ∞ | MAPS IN GENERAL | OBJECT / OBSTACLE / NAME |
| PUBLIC ROBOT | | NON-PASSABLE LANE | ∞ | PRISMATIC MAP | FURNITURE / LUGGAGE |

FIG. 15
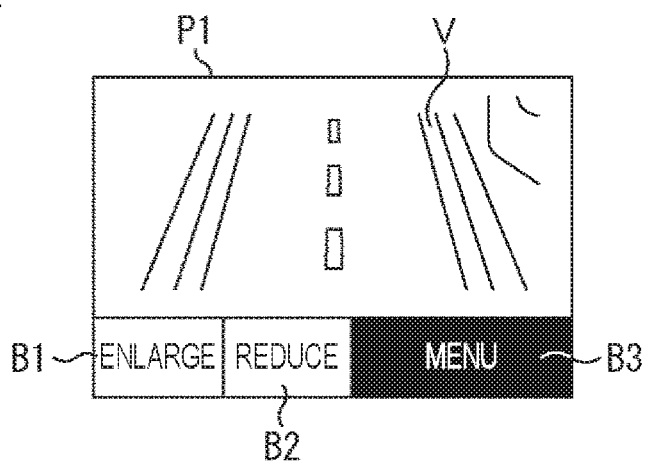
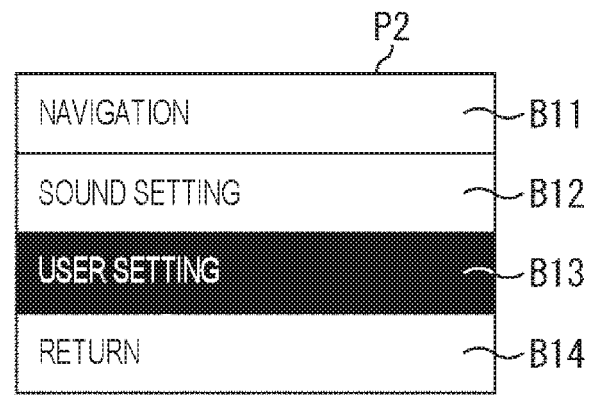
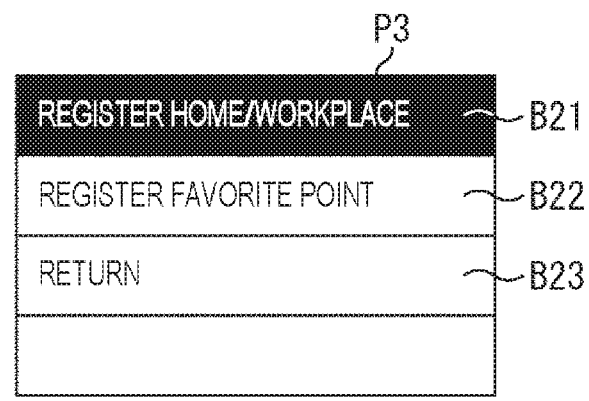
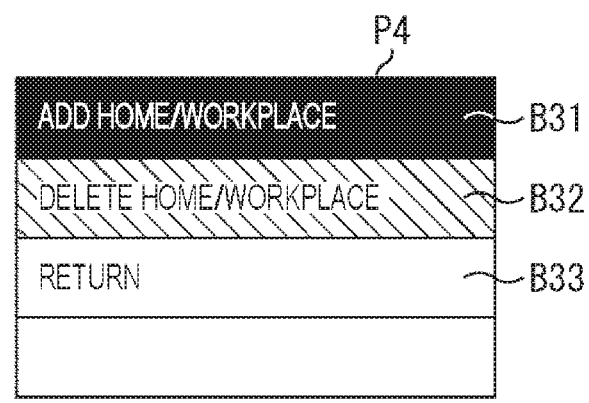

FIG. 17
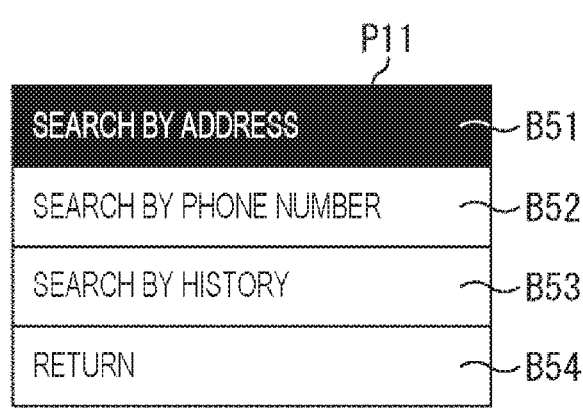
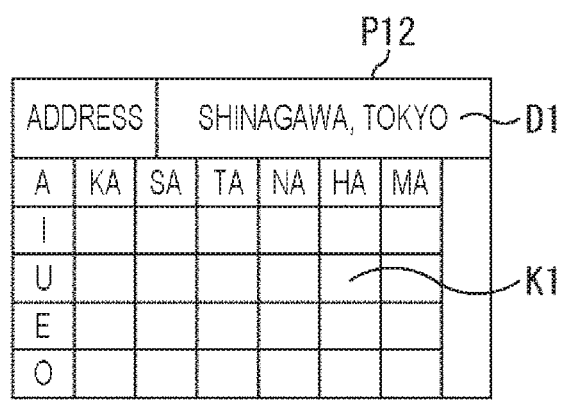
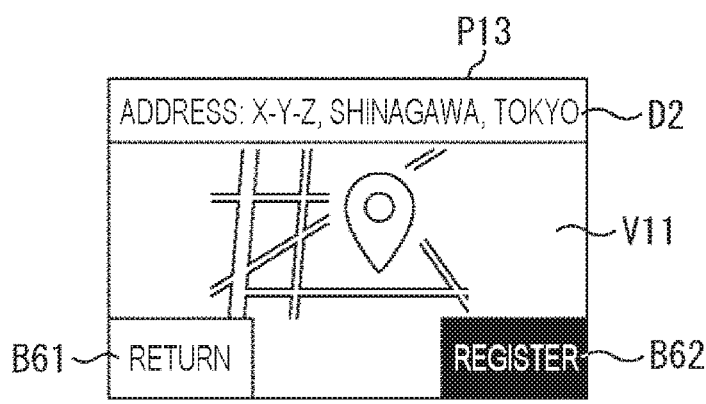
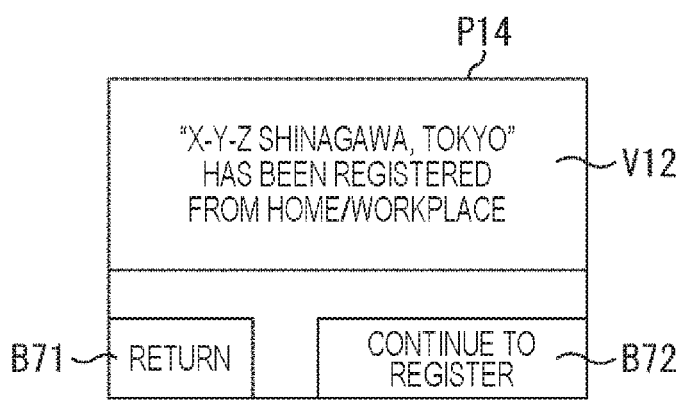

FIG. 19
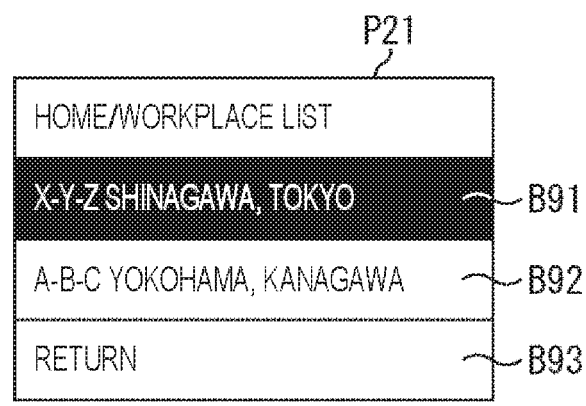
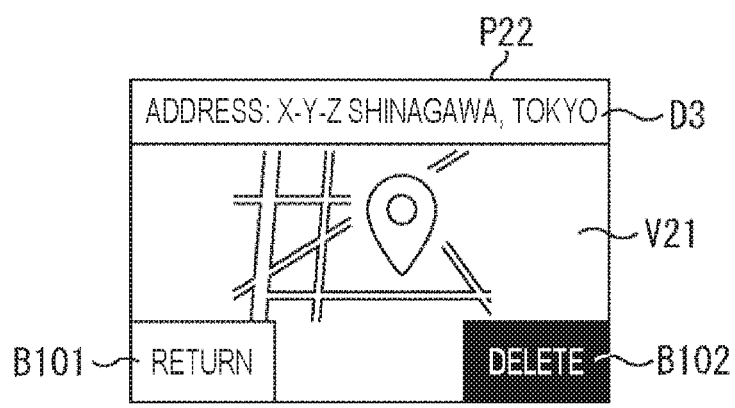
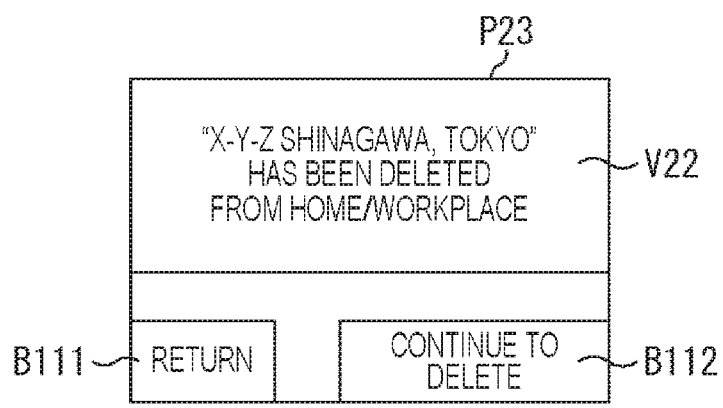

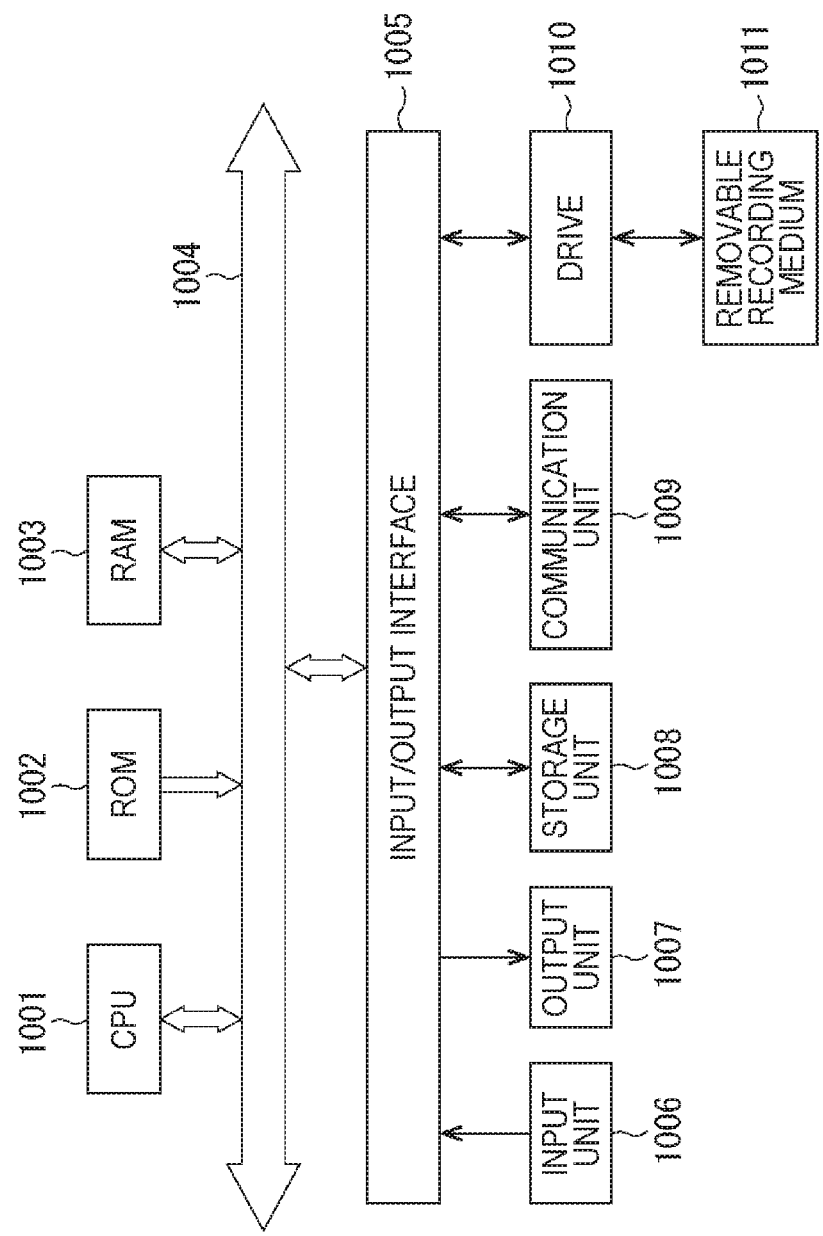

CONTROL DEVICE, CONTROL METHOD, AND MOBILE OBJECT

CROSS REFERENCE TO RELATED APPLICATIONS

This application is a U.S. National Phase of International Patent Application No. PCT/JP2019/000433 filed on Jan. 10, 2019, which claims priority benefit of Japanese Patent Application No. JP 2018-009472 filed in the Japan Patent Office on Jan. 24, 2018. Each of the above-referenced applications is hereby incorporated herein by reference in its entirety.

TECHNICAL FIELD

The present disclosure relates to a control device and a control method, a program, and a mobile object, and in particular, a control device and a control method, a program, and a mobile object that enable efficient planning of a movement route during autonomous movement.

BACKGROUND ART

Generally, an autonomous mobile object makes a movement plan by combining a plurality of maps. For example, in the case of a car navigation device, a global route is planned by using a map such as a road network, and a local route that avoids an obstacle is planned by using a local detailed map created by sensor observation.

Therefore, in a range where the detailed map is provided, the shortest route can be planned so that efficient movement is possible. However, since the data size of the detailed map is large, it is necessary to increase the storage capacity in the car navigation device in order to retain the detailed map in a wide range.

Therefore, a technology has been proposed in which a detailed map is stored in an external storage medium, and only a surrounding map that becomes necessary is decompressed in a memory (see Patent Document 1).

Furthermore, a technology has been proposed in which the data size of a detailed map is reduced by destroying the detailed map that has been retained every arrival at a waypoint from a waypoint, the waypoints having been determined according to a global route plan (see Patent Document 2).

Moreover, a technology has been proposed in which upon creation of a three-dimensional grid map, data of height equal to or below a certain height is deleted to reduce map capacity (see Patent Document 3).

CITATION LIST

Patent Document

Patent Document 1: Japanese Patent Application Laid-Open No. 2009-163156
Patent Document 2: Japanese Patent Application Laid-Open No. 2013-033356
Patent Document 3: Japanese Patent Application Laid-Open No. 2016-149090

SUMMARY OF THE INVENTION

Problems to be Solved by the Invention

However, since the technology of Patent Document 1 is not a means for reducing the capacity of the detailed map itself, for example, the capacity of the external storage medium becomes extremely large in order to correspond to a map of the entire Japan. More specifically, in a case of creating a detailed map of Japan with the area of 378000 $km^2$ on a 10 cm square grid without compression, the capacity of the detailed map is about 4.7 TB.

Furthermore, in the technique of Patent Document 2, even during a round trip to a predetermined point, the map of an outward route is destroyed at time point of arrival at a target point. Therefore, it is necessary to create the map again on a return route, and it is a waste of processing efficiency regarding route search.

Moreover, in the technology of Patent Document 3, which is the method of reducing the size of the map to be created itself, the data size monotonously increases according to time and distance.

The present disclosure has been made in view of such a situation, and particularly, is to effectively use storage capacity while saving the storage capacity and to efficiently plan a movement route by storing or forgetting (deleting) a detailed map of the past according to importance during autonomous movement.

Solution to Problems

A control device according to an aspect of the present disclosure is a control device that controls movement of a mobile object, and is a control device including a global-route planning unit that plans a global route to a destination, and a map storage unit that retains a map of an area with high importance in an area on the global route for a retention period according to the degree of importance.

A control method according to an aspect of the present disclosure is a control method of a control device that controls movement of a mobile object, and is a control method including a global route planning process of planning a global route to a destination, and a map storage process of retaining a map of an area with high importance in an area on the global route for a retention period according to the degree of importance.

A program according to an aspect of the present disclosure is a program for causing a computer that controls a control device which controls movement of a mobile object to function as a global-route planning unit that plans a global route to a destination, and a map storage unit that retains a map of an area with high importance in an area on the global route for a retention period according to the degree of importance.

A mobile object according to an aspect of the present disclosure includes a global-route planning unit that plans a global route to a destination, a map storage unit that retains a map of an area with high importance in an area on the global route for a retention period according to the degree of importance, a local-route planning unit that plans a local route on the basis of the map stored by the map storage unit, and the global route, an action plan creation unit that creates an action plan on the basis of the local route, and a control unit that controls movement of the mobile object on the basis of the action plan created by the action plan creation unit.

According to an aspect of the present disclosure, a global route to a destination is planned, and a map of an area with high importance in an area on the global route is stored.

Effects of the Invention

According to an aspect of the present disclosure, it is possible to effectively use storage capacity while saving the storage capacity and to efficiently plan a movement route by storing or forgetting (deleting) a detailed map of the past according to the importance especially during autonomous movement.

BRIEF DESCRIPTION OF DRAWINGS

FIG. 6 is a diagram illustrating an example of the main point list, the main-point candidate list, the long-term important area list, the long-term important area candidate list, and the short-term important area list in the self-driving car.

FIG. 7 is a diagram illustrating an example of a main point list, a main-point candidate list, a long-term important area list, a long-term important area candidate list, and a short-term important area list in a public robot.

FIG. 8 is a diagram illustrating an example of the main point list, the main-point candidate list, the long-term important area list, the long-term important area candidate list, and the short-term important area list in the public robot.

FIG. 10 is a diagram illustrating an example of the main point list, the main-point candidate list, the long-term important area list, the long-term important area candidate list, and the short-term important area list in the home robot.

FIG. 11 is a diagram illustrating examples of a retention period, a retention format, and an assumed pair for each retention target managed by detailed maps of a self-driving car, a public robot, and a home robot.

FIG. 15 is a diagram illustrating the main point registration process.

FIG. 17 is a diagram illustrating the process of adding home/workplace.

FIG. 19 is a diagram illustrating the home/workplace deletion process.

FIG. 29 is a diagram illustrating a configuration example of a general-purpose computer.

MODE FOR CARRYING OUT THE INVENTION

Hereinafter, preferred embodiments of the present disclosure will be described in detail with reference to the accompanying drawings. Note that in the present Description and the drawings, the same reference signs denote constituents having substantially the same functional configuration and an overlapping description will be omitted.

Hereinafter, embodiments for implementing the present technology will be described. The description will be given in the following order.

1. Overview of present disclosure
2. Preferred embodiments
3. Example of execution by software 1. Overview of Present Disclosure A mobile object according to the present disclosure is a mobile object that effectively uses storage capacity while saving the storage capacity and efficiently plans a movement route by storing or forgetting (deleting) a detailed map of the past according to the importance when the mobile object autonomously moves.

More specifically, the present disclosure is realized by planning a local route using a detailed map generated in past movement, for example, when the autonomous mobile object moves in the same area or across close areas a plurality of times.

In other words, by using a detailed map created when a mobile object moved in a predetermined area in the past, thereafter, in a case where the mobile object moves in the same area as the predetermined area or an area close to the predetermined area for the second time or later, by using the observation results of a sensor during movement, it is possible to plan an optimum route at a timing earlier than the timing of creating a detailed map again.

Figure 1:
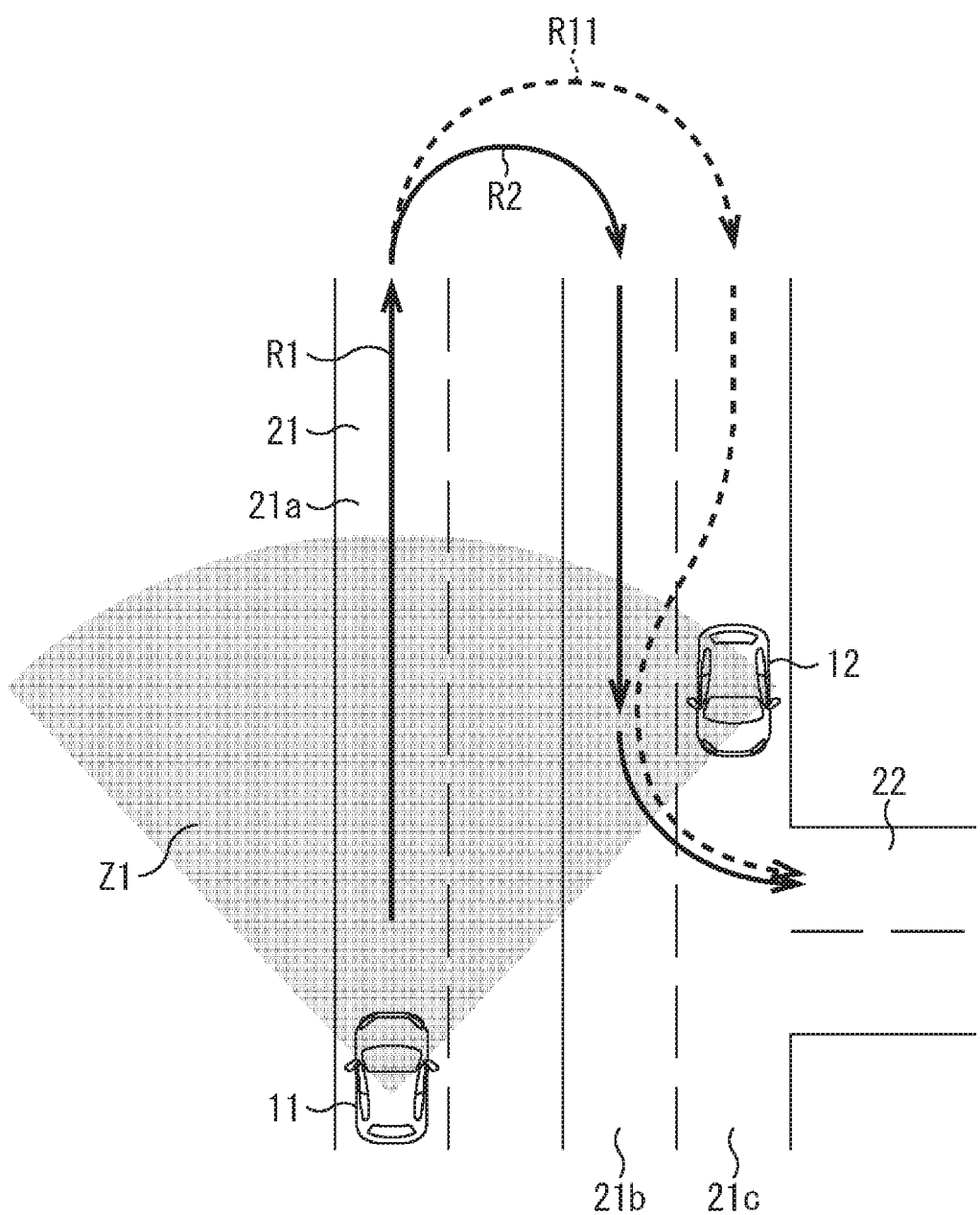
FIG. 1 is a diagram illustrating an overview of the present disclosure.

More specifically, for example, in a case where a mobile object that autonomously moves is a vehicle, as illustrated in FIG. 1, a case will be considered where after a mobile object (vehicle) 11 travels on a road 21 upward in FIG. 1 while detecting an obstacle in a range Z1, the mobile object (vehicle) 11 travels downward in FIG. 1 and turns left to enter the road (enters rightward in FIG. 1).

In FIG. 1, a parked vehicle 12 exists in a lane 21c of a road 21. Furthermore, a movement route includes, for example, a global route planned in units of roads and a local route planned in units of lanes. Here, the global route is, for example, a movement route of the mobile object (vehicle) 11 planned from a departure place and a destination in units of roads on a map. Furthermore, the local route is, for example, a movement route in units of lanes which is more detailed than the movement route in units of roads, and is planned in accordance with the detected location of an obstacle detected by a sensor of the mobile object 11, in addition to the global route.

In FIG. 1, a movement plan based on a local route such as traveling in the left lane with respect to the traveling direction is made for the mobile object (vehicle) 11 unless an obstacle is detected on the basis of the observation result of the sensor.

In the case of using the conventional technology, the vehicle 11 travels in a lane 21a of the road 21 as illustrated by a movement route R1 in a solid line in FIG. 1, passes by a road 22 on its right while moving upward in FIG. 1, and then travels in the lane 21c in the downward direction in FIG. 1. Then, when the vehicle 11 detects the parked vehicle 12 ahead as indicated by a local route R11 in a dotted line, the vehicle 11 changes the local route from the lane 21c to the lane 21b, and then turns left toward the road 22.

In contrast, in the technology of the present disclosure, in a case where it is apparent from the global route that the mobile object 11 moves on the road 21 upward in FIG. 1 as illustrated in FIG. 1, and then makes a turn to move downward in FIG. 1 and to enter the road 22, a detailed map including the position of the parked vehicle 12 created when the mobile object 11 travels in the lane 21a upward in FIG. 1 and passes through an entrance of the road 22 is stored as information with high importance.

Then, when the vehicle 11 moves downward in FIG. 1 on the road 21, on the basis of the detailed map including the position of the parked vehicle 12 stored in advance, the vehicle 11 plans a local route of moving downward in the lane 21b and turns left to enter the road 22 as indicated by a movement route R2 in a solid line without waiting for the observation result of the sensor.

As described, by storing a detailed map of a point with high importance in a detailed map created once, a local route can be efficiently planned while reducing the data amount of the detailed map.

Figure 2:
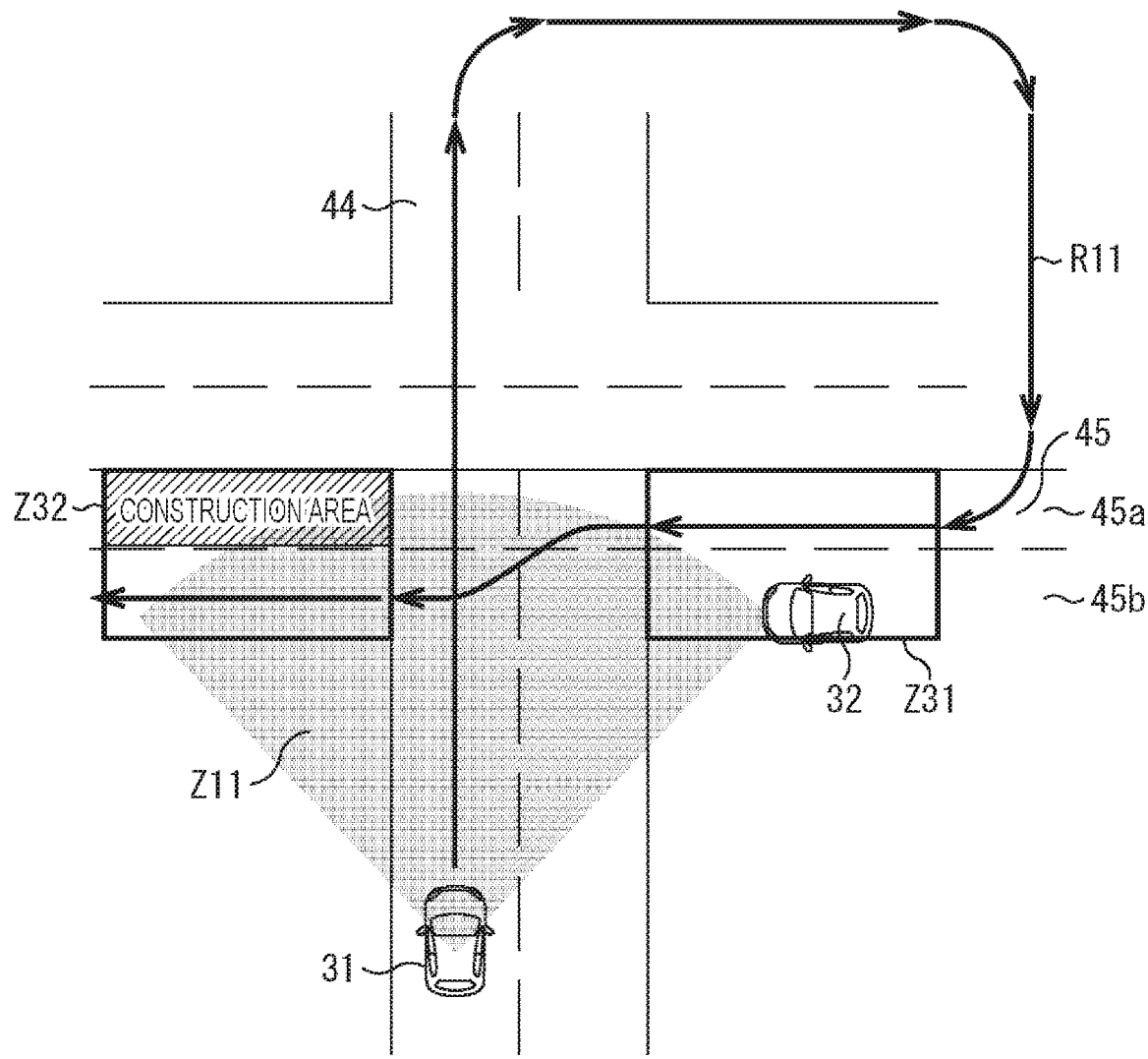
FIG. 2 is a diagram illustrating an overview of the present disclosure.

Furthermore, as illustrated in FIG. 2, a case will be considered where there is an intersection of roads 44 and 45 and the route where a mobile object (vehicle) 31 moves on the road 44 in FIG. 2 upward in FIG. 2 and then moves on the road 45 leftward in FIG. 2 is planned as a global route.

Moreover, a case will be considered where there is an area Z31 where a parked vehicle 32 exists on a lane 45b at a location on the right side in FIG. 2 of the intersection of the roads 44 and 45, and there is an area Z32 where a construction area exists in a lane 45a at a location on the left side in FIG. 2 of the intersection of the roads 44 and 45. In this case, by observing a range Z11 with the sensor, when the vehicle 31 passes through the intersection of the roads 44 and 45 while traveling upward on the road 44 in FIG. 2, the vehicle 31 can detect the area Z31 where the parked vehicle 32 exists in the lane 45b and the area Z32 where a construction area exists.

At this time, since the intersection of the roads 44 and 45 is a location where the vehicle 31 will pass again on the global route, the intersection is considered as an area with high importance, and a detailed map including the areas Z31 and Z32 is stored in order to plan a local route later.

Then, when the vehicle 31 moves on the road 45 leftward in FIG. 2 on the basis of the information of the stored detailed map in the vicinity of the intersection of the roads 44 and 45, as illustrated in FIG. 2, the local route R11 can be planned to pass through the lane 45a in the area Z31 where the parked vehicle 32 exists, and to pass through the lane 45b in the area Z32 where the construction area exists.

As a result, in FIGS. 1 and 2, the vehicles 11 and 31 do not plan the local routes after acquiring the observation results of the sensor but use the detailed maps stored at a timing before acquiring the observation results of the sensor, respectively. Therefore, the vehicles 11 and 31 can effectively plan the local routes.

That is, the autonomous mobile object of the present disclosure can effectively plan a local route by selectively retaining or by forgetting (deleting) a detailed map acquired in advance according to the importance on the global route.

2. Preferred Embodiments

<Configuration Example of a Mobile-Object Control System that Controls a Mobile Object of Present Disclosure>

A mobile-object control system that controls the mobile object 11 (or 31) for achieving the above-described functions will be described. Note that hereinafter, the mobile object 11 (or 31) is simply referred to as the mobile object 11.

Figure 3:
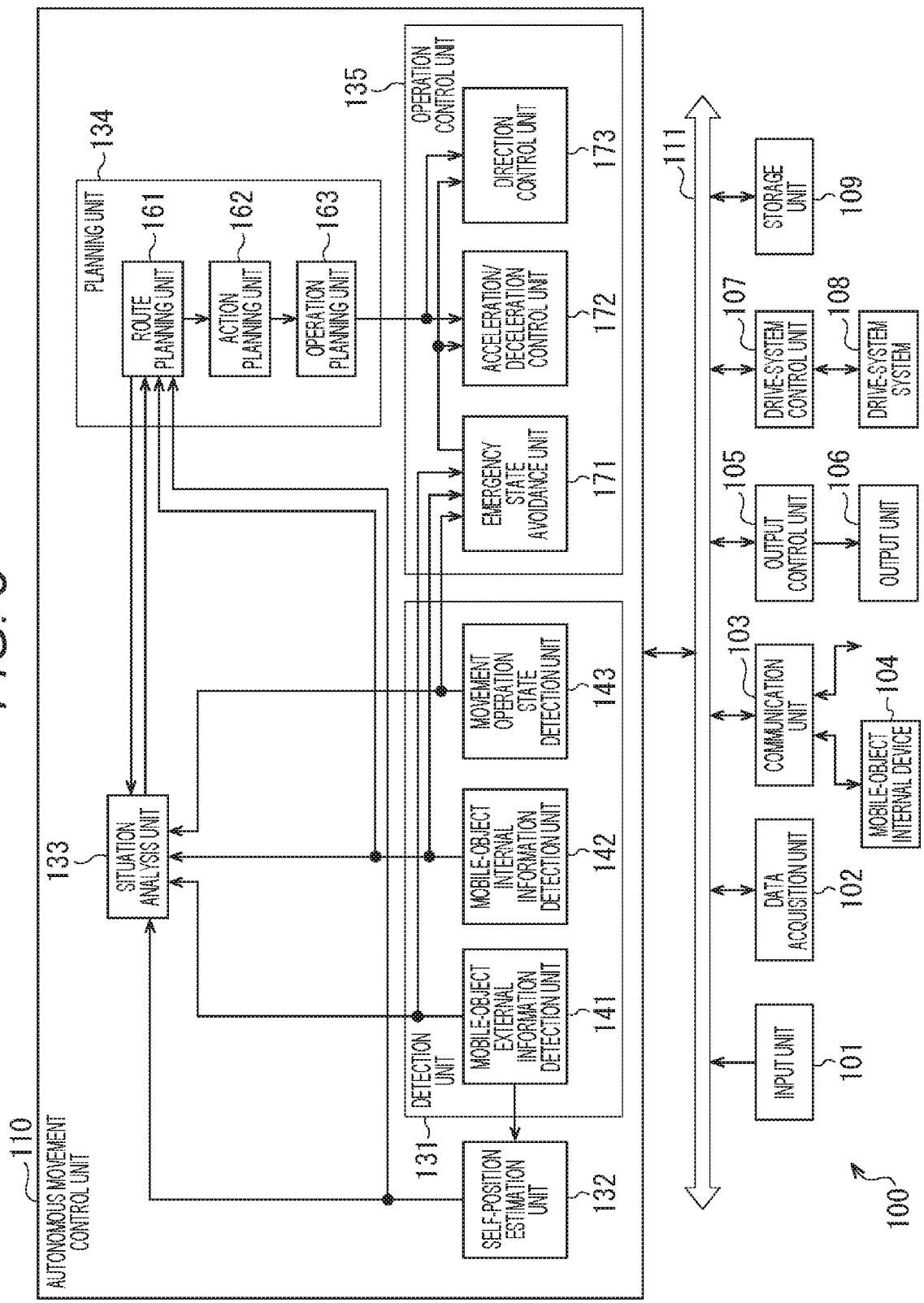
FIG. 3 is a block diagram illustrating a configuration example of a mobile-object control system that controls a mobile object according to the present disclosure.

FIG. 3 is a block diagram illustrating a configuration example of a mobile-object control system 100 that controls the mobile object 11 according to the present disclosure. Note that the mobile-object control system 100 in FIG. 3 is an example of a mobile-object control system that controls the mobile object 11 including a vehicle or a robot to which the present technology can be applied; however, can also be applied as a system for controlling another mobile object such as an aircraft, a ship, a multi-rotor copter (drone), or the like. Furthermore, the robot may be a wheel-type robot, a self-driving car that can be boarded, or a multi-legged walking robot.

The mobile-object control system 100 includes an input unit 101, a data acquisition unit 102, a communication unit 103, a device 104 inside a mobile object, an output control unit 105, an output unit 106, a drive-system control unit 107, a drive-system system 108, a storage unit 109, and an autonomous movement control unit 110. The input unit 101, the data acquisition unit 102, the communication unit 103, the output control unit 105, the drive-system control unit 107, the storage unit 109, and the autonomous movement control unit 110 are mutually connected via a communication network 111. The communication network 111 is, for example, a local area network (LAN) such as Controller Area Network (CAN), Local Interconnect Network (LIN), IEEE802.3, or the like, a communication network and a bus conforming to any standard such as FlexRay (registered trademark), a unique communication system that is not standardized, or the like. Note that the respective units of the mobile-object control system 100 are directly connected to one another without the communication network 111 in some cases.

Note that hereinafter, in a case where each unit of the mobile-object control system 100 communicates via the communication network 111, the description of the communication network 111 is omitted. For example, in a case where the input unit 101 and the autonomous movement control unit 110 communicate with each other via the communication network 111, it is simply described that the input unit 101 and the autonomous movement control unit 110 communicate with each other.

The input unit 101 includes a device used by an occupant to input various data, instructions, or the like. For example, the input unit 101 includes an operation device such as a touch panel, a button, a microphone, a switch, a lever, or the like, and an operation device, and the like that enable input by a method other than a manual operation using voice, a gesture, or the like. Furthermore, for example, the input unit 101 may be a remote control device using infrared rays or other radio waves, or an externally connected device such as a mobile device, a wearable device, or the like compatible with operation of the mobile-object control system 100. The input unit 101 creates an input signal on the basis of data, an instruction, or the like input by an occupant, and supplies the input signal to the respective units of the mobile-object control system 100.

The data acquisition unit 102 includes various sensors or the like for acquiring data to be used for processing of the mobile-object control system 100, and supplies the acquired data to each unit of the mobile-object control system 100.

Specifically, for example, the data acquisition unit 102 includes a gyro sensor, an acceleration sensor, an inertial measurement unit (IMU), and a sensor or the like for detecting an operated amount of an acceleration input of an accelerator or the like, an operated amount of deceleration input, an operated amount of a direction instruction input, rotation frequency, input/output energy and a fuel amount of a drive device such as an engine or a motor, an amount of torque of the engine, the motor, or the like, or the rotation speed or torque or the like of a wheel or a joint.

Furthermore, for example, the data acquisition unit 102 includes various sensors for detecting information of outside of the mobile object. Specifically, for example, the data acquisition unit 102 includes an imaging device such as a time-of-flight (ToF) camera, a stereo camera, a monocular camera, an infrared camera, a polarization camera, another camera, and the like. Furthermore, for example, the data acquisition unit 102 includes an environment sensor for detecting weather, a meteorological phenomenon, or the like, and a surrounding information detection sensor for detecting an object around the mobile object. The environment sensor includes, for example, a raindrop sensor, a fog sensor, a sunshine sensor, a snow sensor, and the like. The surrounding information detection sensor includes, for example, a laser ranging sensor, an ultrasonic sensor, a radar, a Light Detection and Ranging, or Laser Imaging Detection and Ranging (LiDAR), a sonar, or the like.

Moreover, for example, the data acquisition unit 102 includes various sensors for detecting the current position of the mobile object. Specifically, for example, the data acquisition unit 102 includes a global navigation satellite system (GNSS) receiver or the like that receives a GNSS signal from a GNSS satellite.

The communication unit 103 communicates with the device 104 inside the mobile object, and various devices, servers, base stations, or the like outside the mobile object, and transmits data supplied from the respective units of the mobile-object control system 100, and supplies the data received to the respective units of the mobile-object control system 100. Note that the communication protocol supported by the communication unit 103 is not particularly limited, and furthermore, the communication unit 103 can support a plurality of types of communication protocols.

For example, the communication unit 103 performs wireless communication with the device 104 inside the mobile object via wireless LAN, Bluetooth (registered trademark), Near Field Communication (NFC), Wireless USB (WUSB), or the like. Furthermore, for example, the communication unit 103 performs wired communication with the device 104 inside the mobile object via a connection terminal (and a cable if necessary), not illustrated, by using a universal serial bus (USB), High-Definition Multimedia Interface (HDMI) (registered trademark), Mobile High-definition Link (MHL) or the like.

Moreover, for example, the communication unit 103 communicates with a device (for example, an application server or a control server) existing on an external network (for example, the Internet, a cloud network, or a company-specific network) via a base station or an access point. Furthermore, for example, the communication unit 103 uses a Peer To Peer (P2P) technology to communicate with a terminal (for example, a terminal of a pedestrian or a store, or a machine type communication (MTC) terminal) existing near the mobile object. Moreover, for example, in a case where the mobile object 11 is a vehicle, the communication unit 103 performs V2X communication such as Vehicle-to-Vehicle communication, Vehicle-to-Infrastructure communication, Vehicle-to-Home communication, Vehicle-to-Pedestrian communication, and the like. Furthermore, for example, the communication unit 103 includes a beacon reception unit, receives radio waves or electromagnetic waves transmitted from a radio station or the like installed on a road, and acquires information such as the current position, congestion, traffic regulation, required time, or the like.

Examples of the device 104 inside the mobile object includes a mobile device or wearable device possessed by an occupant, an information device carried or attached to the mobile object, a navigation device for searching for a route to any destination, and the like.

The output control unit 105 controls output of various types of information to the occupant of the mobile object or to the outside of the mobile object. For example, the output control unit 105 creates an output signal including at least one of visual information (for example, image data) or auditory information (for example, audio data) and supplies the output signal to the output unit 106 to control output of the visual information and the auditory information from the output unit 106. Specifically, for example, the output control unit 105 combines image data captured by different imaging devices of the data acquisition unit 102 to generate a bird's-eye view, a panoramic image, or the like and supplies an output signal including the created image to the output unit 106. Furthermore, for example, the output control unit 105 generates audio data including a warning sound, a warning message, or the like for danger such as collision, contact, entry into a dangerous zone, or the like, and outputs an output signal including the audio data created to the output unit 106.

The output unit 106 includes a device capable of outputting visual information or auditory information to the occupant of the mobile object or to the outside of the mobile object. For example, the output unit 106 includes a display apparatus, an instrument panel, an audio speaker, headphones, a wearable device such as an eyeglass-type display worn by the occupant, a projector, a lamp, or the like. The display apparatus included in the output unit 106 may be, in addition to a device including a normal display, for example, a device that displays visual information in a driver's field of view, such as a head-up display, a transmission-type display, a device having an augmented reality (AR) display function, or the like. Note that the output control unit 105 and the output unit 106 are not indispensable constituents for autonomous movement processing, and therefore may be omitted as necessary.

The drive-system control unit 107 controls the drive-system system 108 by creating various control signals and supplying the various control signals to the drive-system system 108. Furthermore, the drive-system control unit 107 supplies a control signal to the respective units except the drive-system system 108 as necessary, and notifies the respective units except the drive-system system 108 of the controlled condition of the drive-system system 108, for example.

The drive-system system 108 includes various devices related to a drive system of the mobile object. For example, the drive-system system 108 includes a servo motor capable of designating an angle and torque provided at each joint of four legs, a motion controller that decomposes motion of the robot itself during movement into motion of the four legs so that the motion of the robot itself is replaced with the motion of four legs, and a feedback control device including a sensor in each motor or a sensor on a sole of each of the four legs.

In another example, the drive-system system 108 includes a motor including four to six propellers directed upward of the machine body, and a motion controller that decomposes motion of the robot itself during movement into the rotation amount of each motor so that the motion is replaced with the rotation amount.

Moreover, in another example, the drive-system system 108 includes a driving-force generation device for generating driving force for an internal combustion engine, a driving motor, or the like, a driving-force transmission mechanism for transmitting driving force to wheels, a steering mechanism for adjusting a steering angle, a braking device for generating a braking force, an antilock brake system (ABS), an electronic stability control (ESC), an electric power steering device, and the like.

The storage unit 109 includes, for example, a magnetic storage device such as a read only memory (ROM), a random access memory (RAM), a hard disc drive (HDD), and the like, a semiconductor storage device, an optical storage device, a magneto-optical storage device, and the like. The storage unit 109 stores various programs, data, and the like used by each unit of the mobile-object control system 100. For example, the storage unit 109 stores map data such as a three-dimensional highly accurate map such as a dynamic map, a global map that is less accurate than the highly accurate map but covers a wider area, a local map that includes information of the surroundings of the mobile object, and the like.

The autonomous movement control unit 110 performs control related to autonomous movement such as automatic driving or driving assistance. Specifically, for example, the autonomous movement control unit 110 performs cooperative control aiming to realize a function of avoiding collision or mitigating impact of the mobile object, following movement based on the distance between mobile objects, mobile-object speed maintaining movement, or collision warning of the mobile object. Furthermore, for example, the autonomous movement control unit 110 performs cooperative control for autonomous movement or the like of autonomously moving without depending on operation of the operator/user. The autonomous movement control unit 110 includes a detection unit 131, a self-position estimation unit 132, a situation analysis unit 133, a planning unit 134, and an operation control unit 135.

The detection unit 131 detects various types of information necessary for controlling autonomous movement. The detection unit 131 includes a mobile-object external information detection unit 141, a mobile-object internal information detection unit 142, and a mobile-object condition detection unit 143.

The mobile-object external information detection unit 141 performs a detection process of information of the outside of the mobile object on the basis of data or a signal from each unit of the mobile-object control system 100. For example, the mobile-object external information detection unit 141 performs a detection process, a recognition process, and a tracking process of an object around the mobile object, and a detection process of the distance to the object. Examples of objects to be detected include a mobile object, a person, an obstacle, a structure, a road, traffic lights, a traffic sign, road markings, and the like. Furthermore, for example, the mobile-object external information detection unit 141 performs a detection process of the surrounding environment of the mobile object. Examples of the surrounding environment to be detected includes, for example, weather, temperature, humidity, brightness, road surface conditions, and the like. The mobile-object external information detection unit 141 supplies data indicating the result of the detection processes to the self-position estimation unit 132, the situation analysis unit 133, the operation control unit 135, and the like.

The mobile-object internal information detection unit 142 performs a process of detecting information of the inside of the mobile object on the basis of data or a signal from each unit of the mobile-object control system 100. For example, the mobile-object internal information detection unit 142 performs an authentication process and a recognition process of a driver, a detection process of conditions of the driver, a detection process of an occupant, and a detection process of the environment inside the mobile object, and the like. Examples of the conditions of the driver to be detected include a physical condition, an arousal level, a concentration level, a fatigue level, a line-of-sight direction, and the like. Examples of the environment inside the mobile object to be detected include temperature, humidity, brightness, odor, and the like. The mobile-object internal information detection unit 142 supplies data indicating the result of the detection process to the situation analysis unit 133, the planning unit 134, the operation control unit 135, and the like.

The mobile-object condition detection unit 143 performs a detection process of conditions of the mobile object on the basis of data or a signal from each unit of the mobile-object control system 100. Examples of the conditions of the mobile object to be detected include, speed, acceleration, a steering angle, presence/absence and content of abnormality, a driving operation condition, the position and the inclination of a power sheet, a door lock condition, and the condition of another device mounted on the mobile object, and the like. The mobile-object condition detection unit 143 supplies data indicating the results of the detection process to the situation analysis unit 133, the operation control unit 135, and the like.

The self-position estimation unit 132 performs estimation processes of the position, the posture, and the like of the mobile object on the basis of data or a signal from the mobile-object external information detection unit 141. Furthermore, the self-position estimation unit 132 creates, as necessary, a local map (hereinafter, also referred to as a self-position estimation map) used for estimating the self-position. The self-position estimation map is a map that is highly accurate, obtained by using, for example, a technology such as simultaneous localization and mapping (SLAM). The self-position estimation unit 132 causes the storage unit 109 to store the self-position estimation map.

The situation analysis unit 133 stores and forgets (deletes) main points and important areas (which are main road areas, and include an important area for a long term and an important area for a short term to be described later), according to the degree of importance, on the basis of the mobile object and surrounding conditions to manage the main points and the important areas, and supplies the main point and the important area to the planning unit 134 as necessary. Note that the main point is, for example, a point frequently used by the user, and is, for example, a home, a workplace, or the like, and the important area is an area such as a road including a point frequently used by the user. Furthermore, the detailed configuration of the situation analysis unit 133 will be described later with reference to FIG. 4.

The route planning unit 161 plans a global route from the departure place and the destination, and plans a local route on the basis of information of the main point and the important area supplied from the situation analysis unit 133 and the global route, and outputs the global route and the local route to the action planning unit 162. Note that the detailed configuration of the route planning unit 161 will be described later with reference to FIG. 4.

The action planning unit 162 plans action of the mobile object for safely moving on the route planned by the route planning unit 161 within the planned time. For example, the action planning unit 162 plans start, stop, the traveling direction (for example, forward, backward, left turn, right turn, direction change, and the like), moving speed, overtaking, and the like. The action planning unit 162 supplies data indicating the planned action of the mobile object to the operation planning unit 163 and the like.

The operation planning unit 163 plans operation of the mobile object to achieve the action planned by the action planning unit 162. For example, the operation planning unit 163 plans acceleration, deceleration, a movement trajectory, and the like. The operation planning unit 163 supplies data indicating the planned action of the mobile object to the operation control unit 135 and the like.

The operation control unit 135 controls operation of the mobile object.

More specifically, on the basis of detection results of the mobile-object external information detection unit 141, the mobile-object internal information detection unit 142, and the mobile-object condition detection unit 143, the operation control unit 135 performs a detection process of an emergency state such as collision, contact, entry into a danger zone, an abnormality of a driver, an abnormality of the mobile object, and the like. In a case where the operation control unit 135 detects occurrence of an emergency state, the operation control unit 135 plans operation of the mobile object for avoiding the emergency state, such as a sudden stop, a sharp turn, or the like.

Furthermore, the operation control unit 135 controls acceleration or deceleration for achieving operation of the mobile object planned by the operation planning unit 163. For example, the operation control unit 135 calculates a control target value of the driving-force generation device or the braking device for achieving the planned acceleration, deceleration, or sudden stop, and supplies a control command indicating the calculated control target value to the drive-system control unit 107.

The operation control unit 135 performs direction control for achieving operation of the mobile object planned by the operation planning unit 163. For example, the operation control unit 135 calculates a control target value of a steering mechanism for achieving the moving trajectory or the sharp turn planned by the operation planning unit 163, and supplies a control command indicating the calculated control target value to the drive-system control unit 107.

<Detailed Configuration Example of Autonomous Movement Control Unit>

Next, with reference to FIG. 4, a specific configuration example of the situation analysis unit 133 and the planning unit 134 in the mobile-object control system 100 of FIG. 3 will be described.

The situation analysis unit 133 includes a short-term important area management unit 201, a long-term important area management unit 202, an instantaneous-map creation unit 203, an area management unit 204, and a detailed-map management unit 205.

The short-term important area management unit 201 manages the short-term important area by using a short-term important area list 221 on the basis of the global route supplied from the global-route planning unit 251 in the route planning unit 161 of the planning unit 134.

The short-term important area is an area such as a road through which the mobile object 11 is going to pass soon, on the basis of the global route planned by the global-route planning unit 251 as a result of the departure place and the destination being set, the road map stored in the storage unit 109, and the information of the self position output by the self-position estimation unit 132.

In a case where the short-term important area list 221 is updated, the long-term important area management unit 202 registers a short-term important area newly registered in the short-term important area list 221 in a long-term important area candidate list 214.

Furthermore, in a case where the short-term important area list 221 is updated, the long-term important area management unit 202 adds a score with respect to a long-term important area candidate (corresponding to the short-term important area) already registered in the long-term important area candidate list 214. In a case where the score becomes greater than a predetermined score, the long-term important area management unit 202 registers the long-term important area candidate is registered as a long-term important area in the long-term important area list 213.

Moreover, in a case where a departure place and a destination are set so that the global route is planned by the global-route planning unit 251, when the departure place and the destination are new points, the long-term important area management unit 202 registers the departure place and the destination as the main-point candidate in a main-point candidate list 212, on the basis of the information of the road map stored in the storage unit 109.

Furthermore, in a case where a departure place and a destination are set so that the global route is planned by the global-route planning unit 251, when the departure place and the destination have been already registered as the main-point candidates in the main-point candidate list 212, the long-term important area management unit 202 adds a score of the corresponding main-point candidate. In a case where the score exceeds a predetermined score, the long-term important area management unit 202 registers the main-point candidate as a main point in the main point list 211.

Moreover, in a case where a new main point is registered in the main point list 211, the long-term important area management unit 202 regards a road in the periphery of the main point newly registered as a long-term important area, and registers the road in the long-term important area list 213.

Furthermore, the long-term important area management unit 202 receives operation input of the input unit 101, receives input of position information as a main point from the user, and registers the position information in the main point list 211.

To summarize the above processing, in a case where the departure place and the destination are input by the user and the global route is obtained as the route, the departure place and the destination are registered in the main-point candidate list 212 if the departure place and the destination are new as the main-point candidates, and a score is added for each main-point candidate if the departure place and the destination have already been registered as main-point candidates in the main-point candidate list 212. Then, the similar processing is repeated, and as a result of the cumulative addition of the scores, when the score becomes higher than a predetermined value, the main-point candidates registered in the main-point candidate list 212 are regarded as the main points and are registered in the main point list 211.

Furthermore, in a case where a global route is planned, for example, a road on the route from the departure place to the destination is registered as a short-term important area in the short-term important area list 221. Here, in a case where the short-term important area is not registered as a long-term important area candidate in the long-term important area candidate list 214, the short-term important area is registered as a long-term important area candidate. In a case where the short-term important area is registered as a long-term important area candidate in the long-term important area candidate list 214, a score is added. Then, in a case where the similar processing is repeated and the score is cumulatively added so that the score is greater than a predetermine value, information of the area to be a long-term important area candidate is regarded as a long-term important area, and is registered in the long-term important area list 213.

Furthermore, in a case where a new main point is newly registered in the main point list 211, a road in the periphery of the main point the newly registered is registered as a long-term important area in the long-term important area list 213. Moreover, a main point can be registered in the main point list 211 by the user. Even in a case where a main point is newly registered by the user, a road in the periphery of the newly registered main points is registered as a long-term important area in the long-term important area list 213.

That is, a main point is information of a long-term important position that is frequently set when a global route and a local route are planned, and is, for example, home or a commuting destination of the user.

Furthermore, the long-term important area is an area such as a long-term important road that is frequently set when planning a global route and a local route. For example, the long-term important area is the area of the road set on a commutation road on which the user goes between home and workplace.

On the basis of information detected by the data acquisition unit 102 supplied from the detection unit 131 and the map information stored in the storage unit 109, an instantaneous-map creation unit 203 creates an instantaneous map (detailed map in an observation area of a sensor at a predetermined timing), and outputs the instantaneous map to the area management unit 204. In a case where the data acquisition unit 102 includes a plurality of observers, the instantaneous-map creation unit 203 creates an instantaneous map according to the position and the posture of each observer and characteristics of the sensor. The instantaneous-map creation unit 203 operates with input of the sensor data as a trigger, creates an instantaneous map, performs a filtering process on the created instantaneous map to remove noise, or performs conversion to a two-dimensional map.

On the basis of the information of the instantaneous map created by the instantaneous-map creation unit 203, the main point list 211, the long-term important area list 213, and the short-term important area list 221, the area management unit 204 determines the area to be added to and the area to be deleted from the detailed map, and outputs the area to be added to and the area to be deleted from the detailed map to the detailed-map management unit 205. More specifically, the area management unit 204 determines a period in which the map is to be retained according to importance for each area. Retention areas are set such that the retention period is set for each of the long-term important area, the short-term important area, and the other area. For example, retention periods are set in three stages such that a long term (for example, one month) is set in the long-term important area, a middle term (for example, one day) is set in the short-term important area, and a short term (for example, several minutes) is set in the other area.

On the basis of information of the area to be added and information of the area to be deleted supplied from the area management unit 204, the detailed-map management unit 205 accumulates and manages a detailed map 231 showing an area where movement is allowed and an area where movement is not allowed, and outputs the detailed map 231 to a local-route planning unit 252 in the route planning unit 161 of the planning unit 134.

More specifically, on the basis of the retention period for each area in the detailed map 231, the detailed-map management unit 205 accumulates information of each area as a detailed map and outputs the information to the local-route planning unit 252 until the retention period expires, and deletes information of an area the retention period for which has expired in the detailed map 231.

The route planning unit 161 includes the global-route planning unit 251 and the local-route planning unit 252.

On the basis of information of the departure place and the destination set when the input unit 101 is operated, the global-route planning unit 251, for example, plans, as a global route, a route obtained by using a global map corresponding to a road network map in a general car navigation system, and outputs the route to the short-term important area management unit 201 and the local-route planning unit 252 of the situation analysis unit 133. More specifically, the map information forming the global route includes, for example, graph-structured data representing a course, a lane, connection between roads such as an intersection. Furthermore, the global-route planning unit 251 receives the self-position supplied from the self-position estimation unit 132, the destination, and the graph structure of the road map stored in the storage unit 109, and searches for and plans a road that leads to the destination. The global-route planning unit 251 uses an algorithm such as a graph search method typical examples of which are Dijkstra algorithm and A*algorithm to plan a global route.

On the basis of the global route supplied from the global-route planning unit 251 and the detailed map 231 output from the detailed-map management unit 205, the local-route planning unit 252 plans, for example, a local route capable of avoiding collision with an obstacle. The local-route planning unit 252 uses, for example, a graph search algorithm typical examples of which are Dijkstra algorithm and A*algorithm and a sampling algorithm a typical example of which is Round-Trip time (RRT) to plan a local route.

<Example of List Managed by Long-Term Important Area Management Unit and Short-Term Important Area Management Unit>

(In Case where Mobile Object is Self-Driving Car)

Next, with reference to FIGS. 5 and 6, configuration examples of the main point list 211, the main-point candidate list 212, the long-term important area list 213, the long-term important area candidate list 214, and the short-term important area list 221 in a case where the mobile object 11 is a self-driving car will be described.

Figure 5:
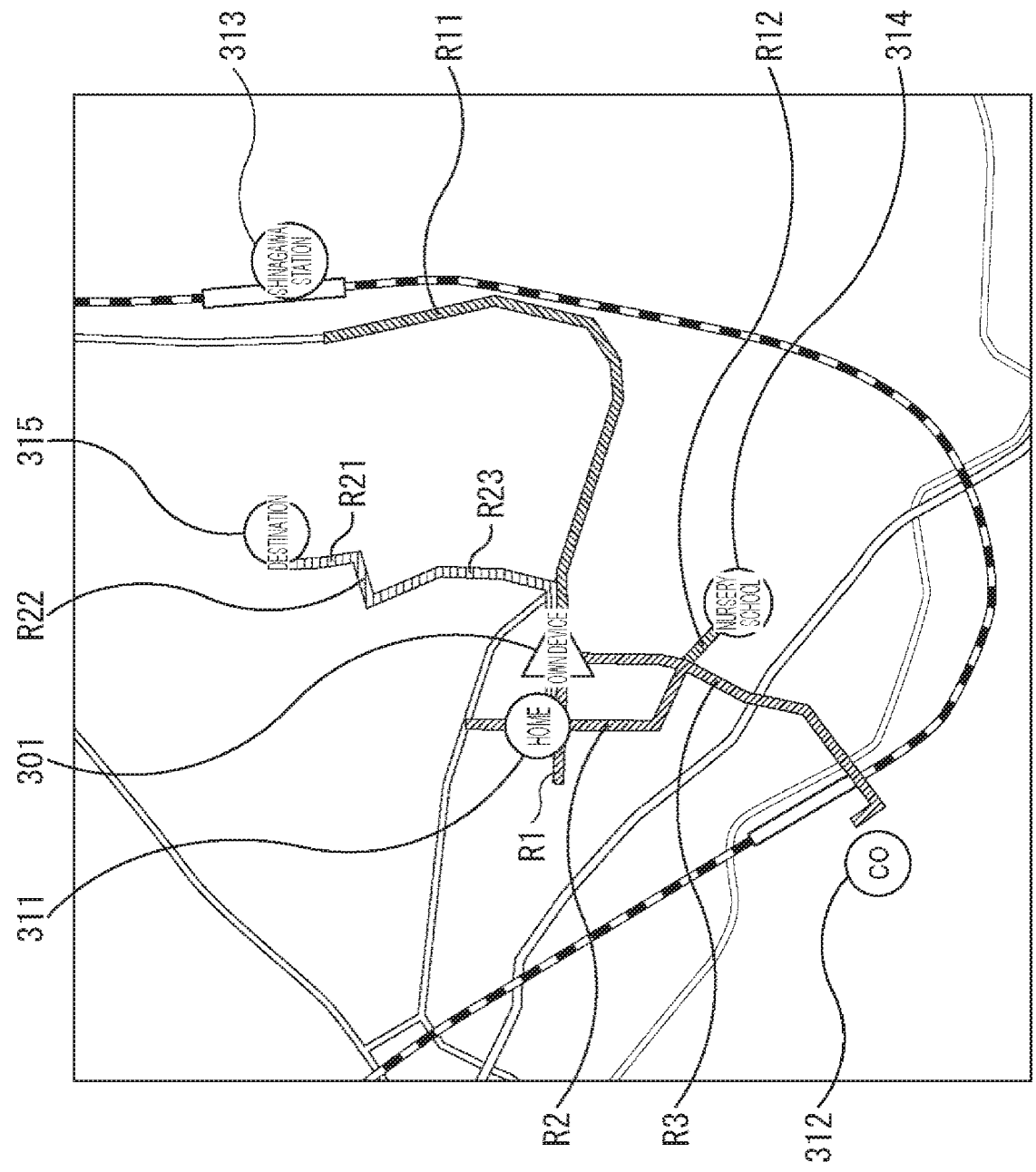
FIG. 5 is a diagram illustrating an example of a main point list, a main-point candidate list, a long-term important area list, a long-term important area candidate list, and a short-term important area list in a self-driving car.

FIG. 5 illustrates an example of the global route in the mobile object 11. With reference to FIG. 5, an example will be described where a destination 315 is set and routes R21 to R23 are planned as a global route in an own device 301 which represents the current position of the mobile object 11.

In FIG. 5, home 311, a workplace 312, Shinagawa station 313, and a nursery school 314 are registered in addition to position information of the own device 301 and the destination 315. The home 311 and the workplace 312 are registered as main points, and Shinagawa Station 313 and the nursery school 314 are registered as main-point candidates.

In the case of FIG. 5, the main point list 211 includes, for example, name, address, type, and time for each main point as illustrated in FIG. 6. Here, name is information of the appellation of a main point, address is information of the address indicating the position of the main point, and type is information indicating how the main point is registered, for example, user input or automatic registration, and time is information of the last update date.

In the upper part of the main point list 211 in FIG. 6, "home" is registered as name, "1-1-1 Shinagawa, Tokyo" is registered as address, "user input" is registered as type, and "20180110" is registered as time, which indicates that the user inputs the home 311, which is a main point, as "home" at the address "1-1-1 Shinagawa, Tokyo", and the last update date is Jan. 10, 2018.

Furthermore, as indicated in the lower part of the main point list 211 in FIG. 6, City Osaki is registered as name, 2-10-1 Osaki, Shinagawa, Tokyo is registered as address, automatic creation is registered as type, and 20171030 is registered as time, which indicates that the workplace 312, which is a main point, is automatically created as "workplace" at address "2-10-1 Osaki, Shinagawa, Tokyo", and the last update date is Oct. 30, 2017.

Moreover, for example, as illustrated in FIG. 6, the main-point candidate list 212 includes name, address, score, and time for each main-point candidate. Here, name is information of the appellation of a main-point candidate, address is information of the address indicating the position of the main-point candidate, score is information of the current score of the main-point candidate, and time is information of the last update date.

In the upper part of the main-point candidate list 212 in FIG. 6, Shinagawa Station is registered as name, 3, Takanawa, Minato, Tokyo is registered as address, 3 is registered as score, and 20171101 is registered as time, which indicates that Shinagawa station 313, which is a main-point candidate, is registered as "Shinagawa station" at the address "3, Takanawa, Minato, Tokyo", has a current score of 3, and is last updated on Nov. 1, 2017.

Furthermore, as indicated in the lower part of the main-point candidate list 212 in FIG. 6, nursery school is registered as name, 1-1-1 Osaki, Shinagawa, Tokyo is registered as address, 14 is registered as score, and 20171015 is registered as time, which indicates that nursery school 314, which is a main point, is registered as a "nursery school" at the address "1-1-1 Osaki, Shinagawa, Tokyo", has a current score of 14, and is last updated on Oct. 15, 2017.

Furthermore, in the long-term important area list 213 of FIG. 6, roads R1 to R3, which are roads in the peripheries of the home 311 and the workplace 312, which are the main points in FIG. 5, are registered as long-term important areas.

For example, as illustrated in FIG. 6, the long-term important area list 213 includes road_id and time for each long-term important area. Here, road_id is information of the ID of the long-term important area, and time is information of the last update date.

More specifically, in the long-term important area list 213 of FIG. 6, 0, 3, and 4 are registered as road_ids and 20171121, 20171201, and 20171225 are registered as time, which indicates that the long-term important areas are areas corresponding to the roads R1 to R3, where road_ids are 0, 3, and 4, respectively, and the last update dates thereof are Nov. 21, 2017, Dec. 1, 2017, and Dec. 25, 2017, respectively.

Moreover, in the long-term important area candidate list 214, roads R11 and R12, which are roads in the peripheries of Shinagawa station 313 and the nursery school 314, which are the main point candidates, are registered as long-term important area candidates.

For example, as illustrated in FIG. 6, the long-term important area candidate list 214 includes road_id, score, and time for each long-term important area candidate. Here, name is information of the appellation of a long-term important area candidate, score is information of the current score of the long-term important area candidate, and time is information of the last update date.

In such a case, for example, as illustrated in FIG. 6, in the long-term important area candidate list 214, 5 and 8 are registered as road_ids, 3 and 14 are registered as scores, and 20171111 and 20171221 are registered as time, which indicates that the long-term important area candidates corresponds to the roads R11 and R12, where road_ids are 5 and 8, respectively, and the last update dates are Nov. 11, 2017, and Dec. 21, 2017, respectively.

Furthermore, since the current global route from the own device 301 to the destination 315 in FIG. 5 is the roads R21 to R23, the roads R21 to R23 are regarded as short-term important areas and are registered in the short-term important area list 221.

For example, as illustrated in FIG. 6, the short-term important area list 221 includes road_id and time for each short-term important area. Here, name is information of the appellation of a short-term important area, and time is information of the last update date.

For example, as illustrated in FIG. 6, in the short-term important area list 221, 0, 5, and 18 are registered as road_id and 20171010, 20171113, and 20171201 are registered as time, which indicates that the short-term important area corresponds to the roads R21 to R23, where road_ids are 0, 5, and 18, respectively, and the last update dates are Oct. 10, 2017, Nov. 13, 2017, and Dec. 1, 2017, respectively.

Note that the short-term important area registered in the short-term important area list 221 is registered in the long-term important area candidate list 214 if the short-term important area has not been registered in the long-term important area candidate list 214, and the score is added if the short-term important area has already been registered in the long-term important area candidate list 214.

(In Case where Mobile Object is Public Robot that Moves Inside Department Store)

Next, with reference to FIGS. 7 and 8, configuration examples of the main point list 211, the main-point candidate list 212, the long-term important area list 213, the long-term important area candidate list 214, and the short-term important area list 221 in a case where the mobile object 11 is a public robot that moves inside a department store will be described.

FIG. 7 illustrates an example of a global route in a case where the mobile object 11 is a robot that moves on a predetermined floor of a department store. With reference to FIG. 7, an example will be described where a destination 365 is set and areas 2101, 2102, and 2103 are planned as a global route in an own device 351 which represents the current position of the robot which is the mobile object 11.

Note that FIG. 7 illustrates arrangement in a predetermined floor. Shelves T1 to T3 are arranged in this order from the upper left, areas 2106, 2108, and 2105 are provided therebetween. Escalators Es1 and Es2, a shelf T4, a pillar H1, and a shelf T5 are arranged in this order from the upper right. The area between the pillar H1 and the shelf T5 is defined as an area 2107. The central portion is divided into areas 2101 to Z104 from above. The mobile object 11 which is a robot moves in the respective areas 2101 to 2107.

In FIG. 7, charging (charging station) 361, a front (in front of the escalators Es1 and Es2) 362, a sales counter A363, and a sales counter B364 are registered in addition to the position information of the own device 351 and the destination 365. The charging 361 and the front 362 are registered as main points, and the sales counter A363 and the sales counter B364 are registered as main-point candidates.

In the case of FIG. 7, the main point list 211 includes, for example, name, address, type, and time for each main point as illustrated in FIG. 8. Here, name is information of the appellation of a main point, address is information indicating the coordinate position of the main point, and type is information indicating how the main point is registered, for example, user input or automatic registration, and time is information of the last update date.

In the upper part of the main point list 211 in FIG. 8, the charging station is registered as name, coordinates (x: 0.5, y: 0.5) are registered as the address, user input is registered as type, and 20180110 is registered as time, which indicates that the user inputs the charging 361, which is a main point, as "charging" at the coordinate position (x: 5, y: 0.5) on the floor illustrated in FIG. 7, and the last update date is Jan. 10, 2018.

Furthermore, in the lower part of the main point list 211 in FIG. 8, in front of escalator is registered as name, coordinates (x: 5.0, y: 8.0) are registered as the address, automatic creation is registered as type, and 20171030 is registered as time, which indicates that in front 362 of escalator, which is a main point, is automatically created as "in front of escalator" at the coordinate position (x: 5.0, y: 8.0) on the floor illustrated in FIG. 7, and the last update date is Oct. 30, 2017.

Moreover, for example, as illustrated in FIG. 8, the main-point candidate list 212 includes name, address, score, and time for each main-point candidate. Here, name is information of the appellation of a main-point candidate, address is information indicating the coordinate position of the main-point candidate, score is information of the current score of the main-point candidate, and time is information of the last update date.

In the upper part of the main-point candidate list 212 in FIG. 8, the sales counter A is registered as name, coordinates (x: 9.0, y: 2.0) are registered as address, 3 is registered as score, and 20171101 is registered as time, which indicates that sales counter A363, which is a main-point candidate, is registered as "sales counter A" at the coordinate position (x: 9.0, y: 2.0) on the floor illustrated in FIG. 7, the current score is 3, and the last updated date is Nov. 1, 2017.

Furthermore, in the lower part of the main-point candidate list 212 in FIG. 8, the sales counter B is registered as name, coordinates (x: 1.0, y: 7.5) are registered as the address, 14 is registered as score, and 20171015 is registered as time, which indicates that the sales counter B364, which is a main-point candidate, is registered as "sales counter B" at the coordinate position (x: 1.0, y: 7.5) on the floor illustrated in FIG. 7, the current score is 14, and the last update date is Oct. 15, 2017.

Furthermore, in the long-term important area list 213 of FIG. 8, the areas 2101 to 2105, which are peripheral areas of the charging 361 and the front 362, which are the main points in FIG. 7, are registered as long-term important areas.

For example, as illustrated in FIG. 8, the long-term important area list 213 includes area_id and time for each long-term important area. Here, area_id is information of the ID of a long-term important area, and time is information of the last update date.

In such a case, for example, as illustrated in FIG. 8, in the long-term important area list 213, 0, 3, 4, . . . are registered as area_ids and 20171121, 20171201, and 20171225 are registered as time, which indicates that the long-term important area is an area where area_ids corresponding to the areas 2101 to 2105 are 0, 3, 4, . . . , and the last update dates corresponding to the areas 2101 to 2105 are Nov. 21, 2017, Dec. 1, 2017, Dec. 25, 2017, . . . , respectively.

Moreover, the areas R106 and R107, which are peripheral areas of the sales counter A363 and the sales counter B364, which are the main-point candidates, are registered as long-term important area candidates.

For example, as illustrated in FIG. 8, the long-term important area candidate list 214 includes area_id, score, and time for each long-term important area candidate. Here, area_id is information of the ID of the long-term important area candidate, score is information of the current score of the long-term important area candidate, and time is information of the last update date.

In such a case, for example, as illustrated in FIG. 8, in the long-term important area candidate list 214, 5 and 8 are registered as area_ids, 3 and 14 are registered as scores, and 20171111 and 20171221 are registered as time, which indicates that the long-term important area candidates are areas where road_ids corresponding to the areas 2106 and 2107 are 5 and 8, respectively, and the last update dates corresponding to the areas 2106 and 2107 are Nov. 11, 2017 and Dec. 21, 2017, respectively.

Furthermore, since the global route from the current own device 351 to the destination 365 is the areas 2101, 2102, and Z108, the areas 2101, 2102, and 2108 are regarded as short-term important areas.

For example, as illustrated in FIG. 8, the short-term important area list 221 includes area_id and time for each short-term important area. Here, area_id is information of the ID of a short-term important area, and time is information of the last update date.

In such a case, for example, as illustrated in FIG. 8, in the short-term important area list 221, 0, 5, and 18 are registered as area_ids and 20171010, 20171113, and 20171201 are registered as time, which indicates that the short-term important area is areas where area_ids corresponding to the areas 2101, 2102, and 2108 are 0, 5, and 18, and the last update dates corresponding to the areas 2101, 2102, and 2108 are Oct. 10, 2017, Nov. 13, 2017, and Dec. 1, 2017, respectively.

Note that the short-term important area registered in the short-term important area list 221 is registered in the long-term important area candidate list 214 if the short-term important area has not been registered in the long-term important area candidate list 214, and the score is added if the short-term important area has already been registered in the long-term important area candidate list 214.

(In Case where Mobile Object is Home Robot that Moves Inside Home)

Next, with reference to FIGS. 9 and 10, configuration examples of the main point list 211, the main-point candidate list 212, the long-term important area list 213, the long-term important area candidate list 214, and the short-term important area list 221 in a case where the mobile object 11 is a home robot that moves inside home will be described.

Figure 9:
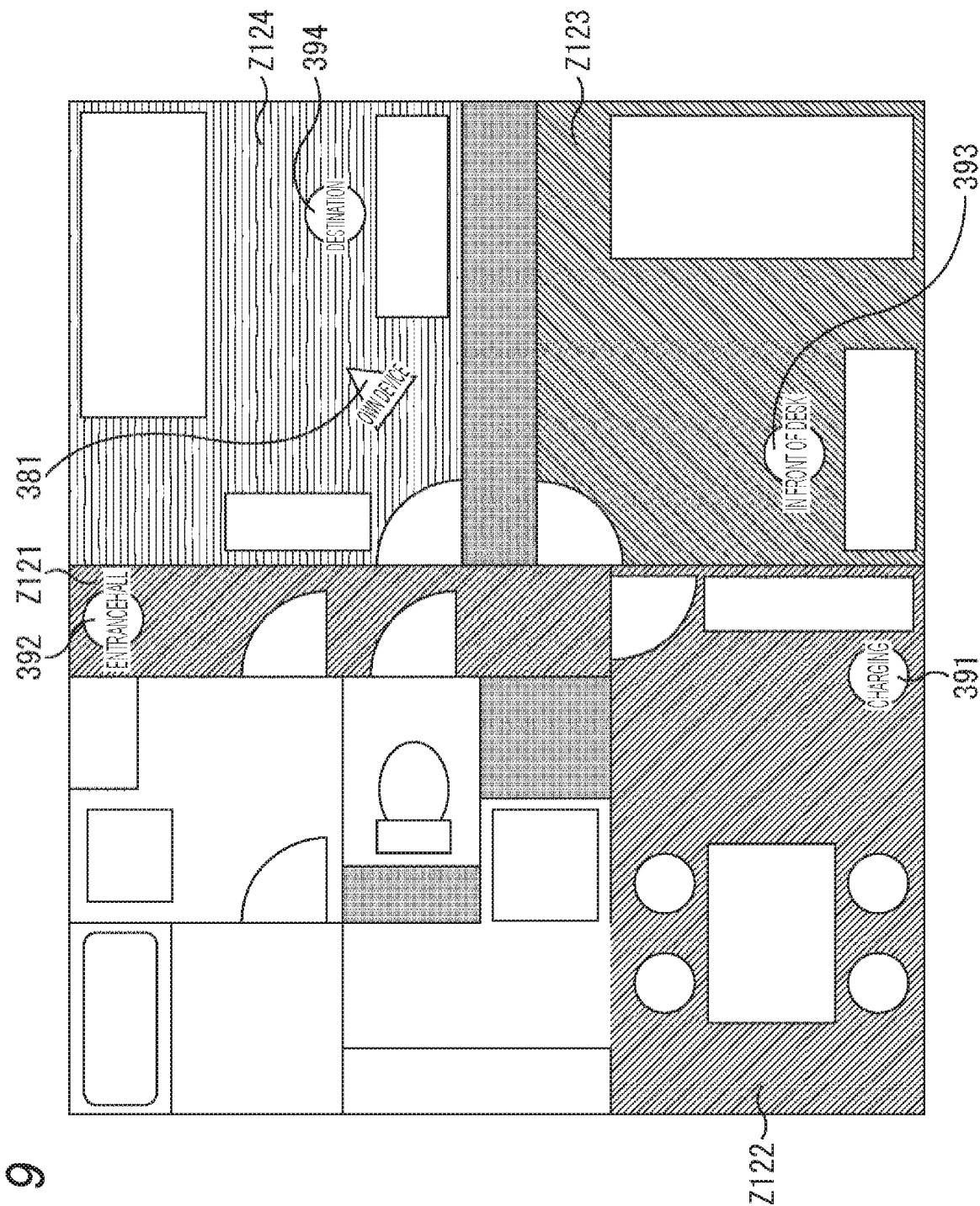
FIG. 9 is a diagram illustrating an example of a main point list, a main-point candidate list, a long-term important area list, a long-term important area candidate list, and a short-term important area list in a home robot.

FIG. 9 illustrates an example of a global route in a case where the mobile object 11 is a home robot that moves inside home. With reference to FIG. 9, an example will be described where a destination 394 is set and an area 2124 is planned as a global route in an own device 381 which represents the current position of the home robot which is the mobile object 11.

Note that FIG. 9 illustrates arrangement in home. It is assumed that rooms are arranged on the upper and lower sides on the right side and on the lower left side, the rooms are referred to as areas 2122 to 2124, respectively, an area 2121, which is a corridor, is set in the center part, and the mobile object 11, which is a robot, moves in the areas 2121 to 2124.

In FIG. 9, charging (charging station) 391, an entrance hall 392, and in front of desk 393 are registered in addition to the position information of the own device 381 and the destination 394. The charging 391 and the entrance hall 392 are registered as main points, and in front of desk 393 is registered as a main-point candidate.

In the case of FIG. 9, the main point list 211 includes, for example, name, address, type, and time for each main point as illustrated in FIG. 10. Here, name is information of the appellation of a main point, address is information indicating the coordinate position of the main point, and type is information indicating how the main point is registered, for example, user input or automatic registration, and time is information of the last update date.

In this case, as illustrated in the upper part of the main point list 211 in FIG. 10, the charging station is registered as name, coordinates (x: 5.0, y: 0.5) are registered as address, user input is registered as type, and 20180110 is registered as time, which indicates that the user inputs the charging 391, which is a main point, as "charging" at the coordinate position (x: 5.0, y: 0.5) in the home illustrated in FIG. 9, and the last update date is Jan. 10, 2018.

Furthermore, as illustrated in the lower part of the main point list 211 in FIG. 10, entrance hall is registered as name, coordinates (x: 5.0, y: 9.0) are registered as address, user input is registered as type, and 20171030 is registered as time, which indicates that the user inputs the entrance hall 392, which is a main point, as "entrance hall" at the coordinate position (x: 5.0, y: 9.0) in the home illustrated in FIG. 9, and the last update date is Oct. 30, 2017.

Moreover, as illustrated in the main-point candidate list 212 in FIG. 10, in front of desk is registered as name, coordinates (x: 6.0, y: 1.0) are registered as address, 16 is registered as score, and 20171101 is registered as time, which indicates that in front of desk 393, which is a main-point candidate, is registered as "in front of desk" at the coordinate position (x: 6.0, y: 1.0) in the home illustrated in FIG. 9, the current score is 16, and the last updated date is Nov. 1, 2017.

Furthermore, the areas 2121 and 2122, which are peripheral areas of the charging 391 and the entrance hall 392, which are the main points, are registered as long-term important areas.

For example, as illustrated in FIG. 10, the long-term important area list 213 includes area_id and time for each long-term important area. Here, area_id is information of the ID of a long-term important area, and time is information of the last update date.

In such a case, in the long-term important area list 213, for example, as illustrated in FIG. 10, 0 and 3 are registered as area_ids and 20171121 and 20171201 are registered as time, which indicates that the long-term important area is an area where area_ids corresponding to the areas 2121 and 2122 are 0 and 3, and the last update dates corresponding to the areas 2121 and 2122 are Nov. 21, 2017, and Dec. 1, 2017, respectively.

Moreover, the area 2123, which is a peripheral area of in front of desk 393, which is the main-point candidate, is registered as a long-term important area candidate.

For example, as illustrated in FIG. 10, the long-term important area candidate list 214 includes area_id, score, and time for each long-term important area candidate. Here, area_id is information of the ID of the long-term important area candidate, score is information of the current score of the long-term important area candidate, and time is information of the last update date.

In such a case, in the long-term important area candidate list 214, for example, as illustrated in FIG. 10, 4 is registered as area_id, 8 is registered as score, and 20171111 is registered as time, which indicates that the long-term important area candidate is an area corresponding to the area 2123 and road_id is 4 and the last update date is Nov. 11, 2017.

Furthermore, since the global route from the current own device 381 to the destination 394 is the area 2124, the area Z124 is regarded as a short-term important area.

For example, as illustrated in FIG. 10, the short-term important area list 221 includes area_id and time for each short-term important area. Here, area_id is information of the ID of a short-term important area, and time is information of the last update date.

In such a case, in the short-term important area list 221, for example, as illustrated in FIG. 10, 5 is registered as road_id and 20171010 is registered as time, which indicates that the short-term important area is an area corresponding to the Z124, where road_id is 5 and the last update date is Oct. 10, 2017.

Note that the short-term important area registered in the short-term important area list 221 is registered in the long-term important area candidate list 214 if the short-term important area has not been registered in the long-term important area candidate list 214, and the score is added if the short-term important area has already been registered in the long-term important area candidate list 214.

<Example of Assumed Target>

Next, assumed targets to be managed as a long-term important area and a short-term important area will be described. The present disclosure, as described with reference to FIGS. 1 and 2, for example, it is conceivable to plan a local route efficiently by managing, as a detailed map, non-passable areas such as a parked vehicle and a construction area as a long-term important area and a short-term important area. However, targets to be managed as a detailed map when a local route is planned is not limited to them.

For example, in a case where the mobile object 11 is a vehicle which is a self-driving car, private land (area without a detailed map of a road and an obstacle (building or the like) in private land) where traffic is restricted as illustrated in the uppermost row of FIG. 11 is conceivable as an assumed target to be managed as a detailed map when a local route is planned. In a case where the assumed target is private land, a target to be retained as a detailed map may be, for example, a map showing private land, and the retention period may be, for example, fixed after first registration (expressed as infinite) (∞) time in FIG. 11), and the retention format may be, for example, maps in general.

Furthermore, as illustrated in the second row of FIG. 11, it is conceivable to manage a parking lot as an assumed target of a detailed map when a local route which allows the mobile object to be easily parked during movement is planned. In a case where the assumed target is a parking lot, a target to be retained as a detailed map may be, for example, an area where a car can be parked, the retention period may be, for example, fixed after first registration (expressed as infinite) (∞) time in FIG. 11), and the retention format may be, for example, a grid map.

Figure 12:
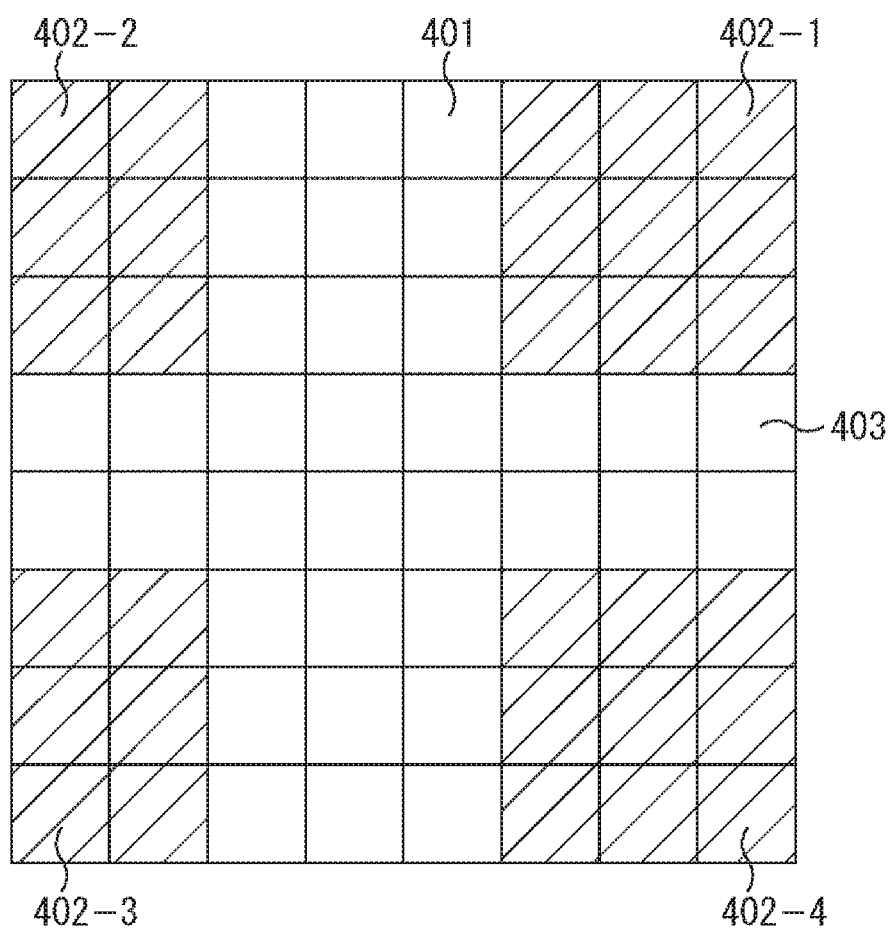
FIG. 12 is a diagram illustrating a grid map.

Note that the grid map is, for example, as illustrated in FIG. 12, a map showing the existence range of a road or an obstacle on each of grids set to a predetermined size in a grid shape, and is managed in forms of the origin position, the grid size, and matrix data.

In FIG. 12, areas 402-1 to 402-4 which are hatched portions in the grids are ranges where obstacles exist, and areas 2401 and 2403 where white grids exist are passable areas. That is, the area 2401 is expressed as a passable road in the vertical direction in FIG. 12, and the area 2403 is expressed as a passable road in the horizontal direction in FIG. 12.

Furthermore, as illustrated in the third row of FIG. 11, it is conceivable to manage construction, an accident, a pedestrian zone, and the like as assumed targets of a detailed map when a local route is planned. In a case where the assumed target is construction, an accident, or a pedestrian zone, the retention target of the detailed map may be, for example, a non-passable lane, the retention period may be, for example, about n hours, and the retention format may be lane information (for example, information of a lane identifier, a start point, and an end point).

Moreover, as illustrated in the fourth row of FIG. 11, when a local route is planned, it is conceivable to manage a parked vehicle, construction, an accident, scattered cargo, an entrance/exit for a construction vehicle, a street stall, a stand, and the like as assumed targets of a detailed map. In a case where the assumed targets are a parked vehicle, construction, an accident, scattered cargo, an entrance/exit for a construction vehicle, a street stall, and a stand, retention targets of the detailed map may be, for example, a stationary obstacle and a non-passable area, the retention period may be, for example, about 24 hours, and the retention format may be a prismatic map.

Figure 13:
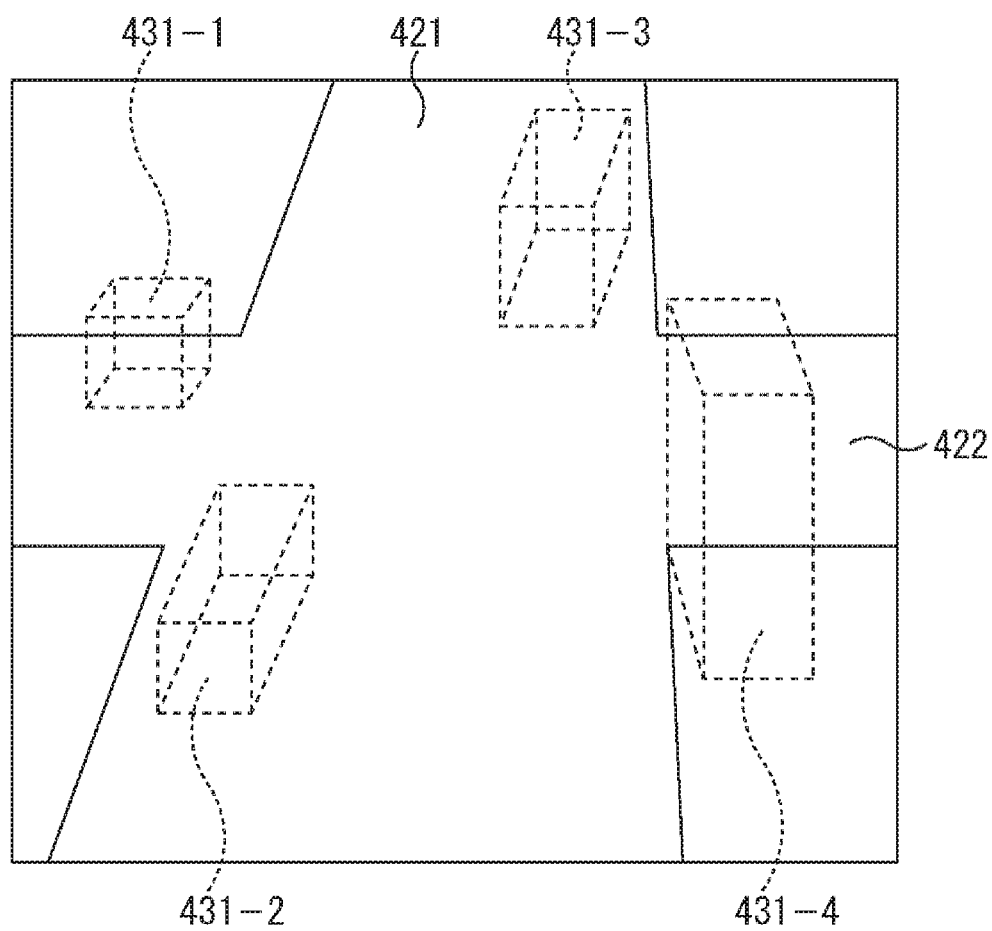
FIG. 13 is a diagram illustrating a prismatic map.

Note that the prismatic map is, for example, as illustrated in FIG. 13, a map showing the existence range of a prism-shaped obstacle or a vehicle indicated by dotted lines on a two-dimensional plane road map, and is managed in forms of the origin positions, the coordinates of the bottom surface configuring a prism, height, and object identification information.

In FIG. 13, prism-shaped objects 431-1 to 431-3 represent vehicles on the road, and an object 431-4 represents a building standing at the corner of an intersection. FIG. 13 indicates that the objects 431-1 to 431-3, which are vehicles, exist on roads 421 and 422, and the object 431-4, which is a building, exists at the corner of the intersection.

Moreover, as illustrated in the fifth row of FIG. 11, it is conceivable to manage congestion as an assumed target of a detailed map when a local route is planned. In a case where the assumed target is congestion, the retention target of the detailed map may be, for example, information of the congestion situation, the retention period may be, for example, about one hour, and the retention format may be lane information (for example, information of a lane identifier, a start point, and an end point).

Moreover, in a case where the mobile object 11 is a home robot, as illustrated in the sixth row of FIG. 11, it is conceivable to manage an object, an obstacle, and a name (object appellation/user appellation/room or area appellation) as assumed targets of a detailed map when a local route is planned. In a case where the assumed target is an object, an obstacle, and a name, the retention target of the detailed map is, for example, a map, and the retention period may be, for example, fixed after the detailed map is registered once, and the retention format may be a prismatic map.

Furthermore, in a case where the mobile object 11 is a public robot, as illustrated in the seventh row of FIG. 11, it is conceivable to manage furniture and luggage as assumed targets of a detailed map when a local route is planned. In a case where the assumed targets are furniture and luggage, the retention target of the detailed map may be, for example, a non-passable area, and the retention period may be, for example, fixed) (∞) after the detailed map is registered once, and the retention format may be a map in general.

Note that examples of the management target to be managed as the detailed map described with reference to FIG. 11 is simply examples, and a management target to be managed as the detailed map may be any information as long as the information is outside information that affects a plan of a movement route that cannot be obtained without observation on the spot. However, hereinafter, for convenience of explanation, a description will be given assuming that the detailed-map management unit 205 creates a detailed map in which a non-passable area is to be managed as an example of the outside information that affects the plan of a movement route, on the basis of information from the area management unit 204, manages the detailed map as the detailed map 231 and outputs the detailed map to the local-route planning unit 252.

<Main-Point List Registration Process>

Next, a main-point list registration process will be described with reference to the flowchart in FIG. 14. Note that there are two types of processes, that is, a process of registering a main point to the main point list 211 on the basis of user input, and a process of registering a main point on the basis of a score added for each main-point candidate registered in the main-point candidate list 212 every time a global route is planned. Here, the main-point registration process based on user input will be described.

In step S11, the long-term important area management unit 202 of the situation analysis unit 133 displays, for example, an image P1 in FIG. 15 as a normal route image on a display or the like including a touch panel in the output unit 106.

In the image P1 of FIG. 15, a route image V is displayed in the upper part. Furthermore, in the lower part of the image P1, a button B1 labeled "enlarge" which is operated when the route image V is enlarged and a button B2 labeled "reduce" operated when the route image V is reduced, and a button B3 labeled "menu" operated to cause various items of a menu to be displayed are displayed in this order from the left.

In step S12, the long-term important area management unit 202 judges whether or not the button B3 has been operated and displaying of the menu has been selected. In a case where displaying of the menu has not been selected, the process proceeds to step S25.

In step S25, the long-term important area management unit 202 judges whether or not an instruction on termination of operation of the autonomous movement control unit 110 has been given, that is, judges whether or not an instruction on stop of a main power supply of the mobile object 11 has been given. In a case where the instruction on the termination is given, the operation is terminated.

In step S25, if the instruction on the termination is not given, the process returns to step S11.

That is, in a case where the user has not operated the button B3 until the instruction on the termination is given, the processes of steps S11, S12, and S25 are repeated, and an image P1, which is a normal route image, is continuously displayed. However, here, in a case where the button B1 or B2 is operated, the normal route image V is enlarged and displayed, or reduced and displayed.

Furthermore, in step S12, in a case where the button B3 is operated and displaying of the menu is selected, the process proceeds to step S13.

In step S13, the long-term important area management unit 202 displays, for example, the image P2 in FIG. 15 on the display of the output unit 106 as a menu image.

In the image P2 in FIG. 15, buttons B11 to B14 are displayed in this order from above. The button B11 is labeled "navigation" and is operated in order to achieve function as a navigation device. The button B12 is labeled "sound setting" and is operated when sound setting is configured. The button B13 is labeled "user setting" and is operated when user setting including registration operation of a main point is configured. The button B14 is labeled "return" and is operated when returning to operation of displaying the image P1 which is the most recent normal route image.

Note that here, in order to explain the main point registration process, the description of the processes related to operation of the buttons B11 and B12 is omitted. Furthermore, in the other description, the description of the processes not particularly related to the main-point registration process will be appropriately omitted.

In step S14, the long-term important area management unit 202 judges whether or not the button B14 has been operated and "return" has been selected. For example, in a case where it is assumed that the button B14 has been operated and "return" has been selected, the process returns to step S11. That is, in this case, the process returns to the process of displaying the most recent normal route image P1.

Furthermore, in step S14, in a case where the button B14 is not operated and "return" is not selected, the process proceeds to step S15.

In step S15, the long-term important area management unit 202 judges whether or not the button B13 has been operated and "user setting" has been selected. In step S15, in a case where the button B13 is not operated, the process returns to step S13. That is, the processes of steps S13 to S15 are repeated, and the image P2 is continuously displayed as the menu image.

Then, in step S15, in a case where the button B13 is operated and "user setting" is selected, the process proceeds to step S16.

In step S16, the long-term important area management unit 202 displays, for example, an image P3 in FIG. 15 as a user setting image, on the display of the output unit 106.

In the image P3 in FIG. 15, buttons B21 to B23 are displayed in this order from above. The button B21 is labeled "registration of home/workplace" and is operated when "home/workplace", which is a main point, is registered. Note that although FIG. 15 illustrates an example in which the main point is "home/workplace", another place is possible.

The button B22 is labeled "registration of a favorite point" and is operated when the user registers a desired point to be registered. Note that since the process related to "registration of favorite point" is irrelevant to the process of registering a main point, hereinafter, the description of the process related to operation of the button B22 will be omitted as appropriate.

The button B23 is labeled "return" and is operated when returning to operation of displaying the image P2, which is the most recent menu image.

In step S17, the long-term important area management unit 202 judges whether or not the button B23 has been operated and "return" has been selected. For example, in a case where it is assumed that the button B23 has been operated and "return" has been selected, the process returns to step S13. That is, in this case, the process returns to the process of displaying the image P2, which is the most recent menu image.

Furthermore, in step S17, in a case where the button B14 is not operated and "return" is not selected, the process proceeds to step S18.

In step S18, the long-term important area management unit 202 judges whether or not the button B21 has been operated and "registration of home/workplace" has been selected. In step S18, in a case where the button B21 is not operated, the process returns to step S16. That is, the processes of steps S16 to S18 are repeated, and the image P3 is continuously displayed as the user setting image.

Then, in step S18, in a case where the button B21 is operated and "registration of home/workplace" has been selected, the process proceeds to step S19.

In step S19, the long-term important area management unit 202 displays, for example, an image P4 in FIG. 15 as a registered image of the home/workplace, on the display of the output unit 106.

In the image P4 in FIG. 15, buttons B31 to B33 are displayed in this order from above. The button B31 is labeled "addition of home/workplace" and is operated when "home/workplace", which is a main point, is added and registered.

The button B32 is labeled "deletion of home/workplace" and is operated when "home/workplace", which is a registered main point, is deleted.

The button B33 is labeled "return" and is operated when returning to operation of displaying the image P3, which is the menu image immediately before.

In step S20, the long-term important area management unit 202 judges whether or not the button B33 has been operated and "return" has been selected. For example, in a case where it is assumed that the button B33 has been operated and "return" has been selected, the process returns to step S16. That is, in this case, the process returns to the process of displaying the image P3, which is the most recent registered image of home/workplace.

Furthermore, in step S20, in a case where the button B33 is not operated and "return" is not selected, the process proceeds to step S21.

In step S21, the long-term important area management unit 202 judges whether or not the button B31 has been operated and "addition of home/workplace" has been selected. In step S21, in a case where the button B31 is operated, the process proceeds to step S22, the process of adding the home/workplace is executed, and the home/workplace is added as a main point to the main point list 211, and the process returns to step S19. Note that the process of adding the home/workplace will be described later with reference to the flowchart of FIG. 16.

Furthermore, in step S21, in a case where the button B31 is not operated, the process proceeds to step S23.

In step S23, the long-term important area management unit 202 judges whether or not the button B32 has been operated and "deletion of home/workplace" has been selected. In step S23, in a case where the button B32 is operated, the process proceeds to step S24, the home/workplace deletion process is executed, and information of the position of the home/workplace that has been registered as a main point to the main point list 211 is deleted, and the process returns to step S19. Note that the home/workplace deletion process will be described later with reference to the flowchart of FIG. 18.

Note that in step S23, in a case where the button B32 is not operated, the process returns to step S19. That is, the processes of steps S19 to S24 are repeated, and the image P4 is continuously displayed as the registered image of the home/workplace.

<Process of Adding Home/Workplace>

Figure 16:
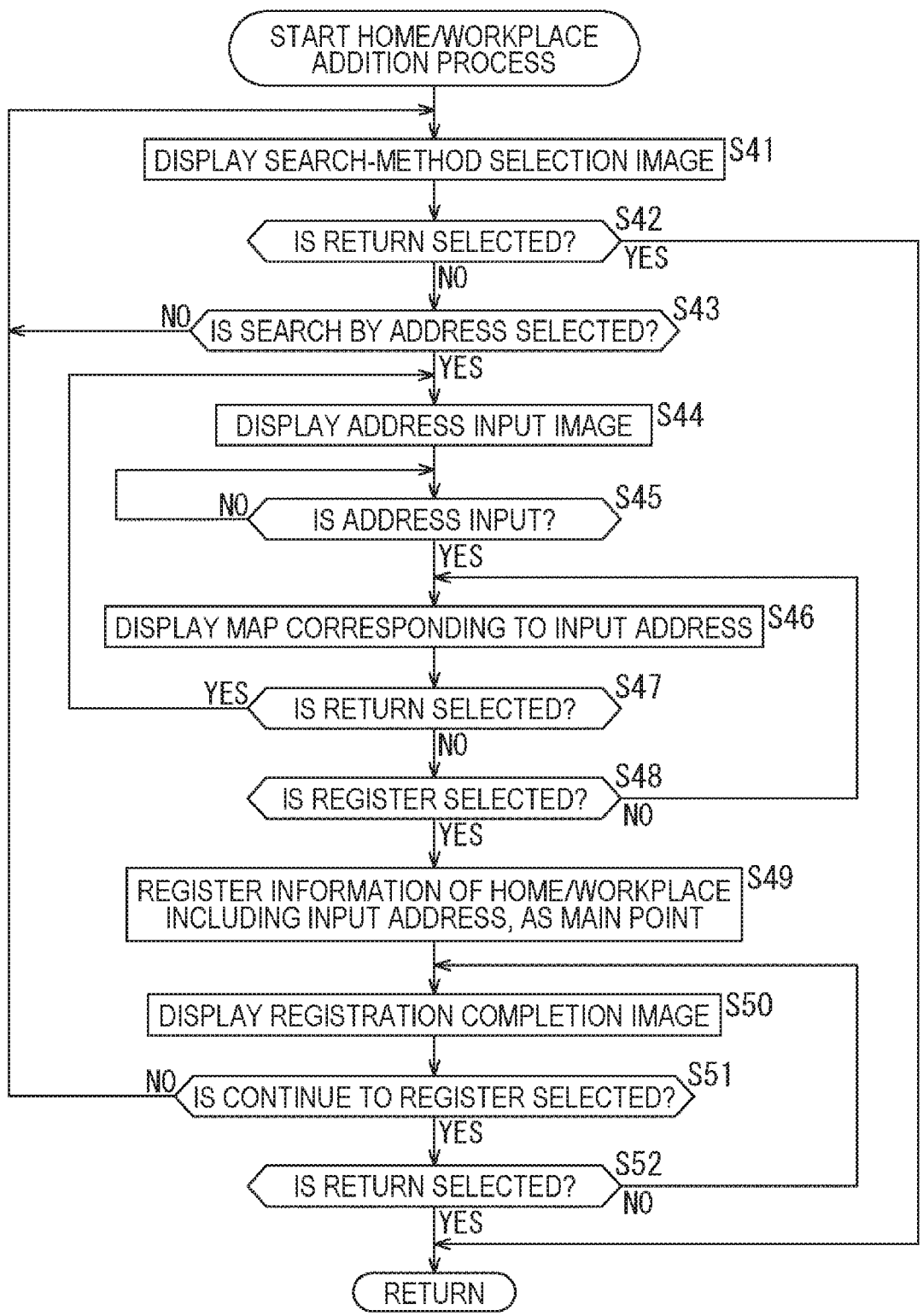
FIG. 16 is a flowchart explaining a process of adding home/workplace.

Here, the process of adding a home/workplace will be described with reference to the flowchart of FIG. 16.

In step S41, the long-term important area management unit 202 displays, for example, an image P11 in FIG. 17 as a search method selection image, on the display of the output unit 106.

The image P11 in FIG. 17 displays buttons B51 to B54 in this order from the top in FIG. 17 as the search method selection image.

The button B51 is labeled "search by address", and is operated in a case where search by address is conducted as a search method.

The button B52 is labeled "search by phone number", and is operated in a case where search by phone number is conducted as a search method.

The button B53 is labeled "search by history", and is operated in a case where search by history is conducted as a search method.

The button B54 is labeled "return" and is operated to return the screen to the home/workplace registration screen.

In step S42, the long-term important area management unit 202 judges whether or not the button B54 has been operated and return has been selected. In step S42, in a case where the button B54 is operated and return is selected, the home/workplace addition process is terminated, the process returns to step S19 in FIG. 14, and returns to the process of displaying the image P4 in FIG. 15.

In contrast, in step S42, in a case where return is not selected, the process proceeds to step S43.

In step S43, the long-term important area management unit 202 judges whether or not the button B51 has been operated and "search by address" has been selected. In step S43, in a case where "search by address" is selected, the process proceeds to step S44.

In step S44, the long-term important area management unit 202 displays, for example, the image P12 in FIG. 17 on the display of the output unit 106 as an address input image.

In the image P12 of FIG. 17, a character input keyboard K1 is displayed, and an input field D1 is displayed thereon. If a user presses various characters on the character input keyboard K1, the characters corresponding to the pressed keys are input to the input field D1 as address information.

In step S45, the long-term important area management unit 202 judges whether or not an address has been input, and repeats a similar process until it is determined that an address has been input. In step S45, for example, when the character input keyboard K1 is operated and information indicating completion of address input is input, it is considered that the address has been input, and the process proceeds to step S46.

In step S46, the long-term important area management unit 202 reads map information stored in the storage unit 109 on the basis of map information corresponding to input address information, and, for example, and displays the map information such as the image P13 in FIG. 17 on the display of the output unit 106.

In the image P13 in FIG. 17, an address display column D2 in which the input address is displayed is provided in the uppermost row, and "X-Y-Z Shinagawa, Tokyo" is displayed in FIG. 17. A map image V11 is displayed under the address display column D2. Moreover, buttons B61 and B62 labeled "return" and "registration" are displayed in the lower left part and the lower right part of the map image V11, respectively.

The button B61 is labeled "return" and is operated when returning to display of the image P12, which is the most recent address input image.

The button B62 is labeled "registration" and is operated when the position information corresponding to the map image V11 is registered as a main point such as home or a workplace.

In step S47, the long-term important area management unit 202 judges whether or not the button B61 has been pressed and "return" has been selected. In step S47, for example, in a case where the button B61 is pressed and "return" is selected, the process returns to step S44, and, for example, the image P12 in FIG. 17 is displayed as the address input image.

In contrast, in step S47, in a case where the button B61 is not pressed and "return" is not selected, the process proceeds to step S48.

In step S48, the long-term important area management unit 202 judges whether or not the button B62 has been pressed and "registration" has been selected. In step S48, in a case where the button B62 is not pressed and "registration" is not selected, the process returns to step S46. That is, in a case where neither the button B61 nor the button B62 is pressed and neither "return" nor "registration" is selected, the processes of steps S46 to S48 are repeated, and a map image such as the image P13 in FIG. 17 is continuously displayed.

In step S48, in a case where "registration" is selected, the process proceeds to step S49.

In step S49, the long-term important area management unit 202 registers, as a main point, the home/workplace including the input address to the long-term important area list 213.

In step S50, the long-term important area management unit 202 displays, as an image indicating completion of registration, for example, a registration completion image such as an image P14 in FIG. 17

In the image P14 of FIG. 17, a confirmation image V12 is provided in the upper row, "'X-Y-Z Shinagawa, Tokyo,' is registered as home/workplace', which indicates that registration as a main point to the main point list 211 has been completed. Furthermore, buttons B71 and B72 labeled "return" and "continue to register" are displayed in the lower left part and the lower right part of the confirmation image V12, respectively.

The button B71 is labeled "return", and is operated when the home/workplace addition process is terminated and the display is return to display of the image P4, which is the registered image of the home/workplace in FIG. 15.

The button B72 is labeled "continue to register" and is operated when a new home/workplace is continuously registered as a main point.

In step S51, the long-term important area management unit 202 judges whether or not the button B72 has been operated and "continue to register" has been selected. In step S51, in a case where it is considered that the button B72 has been operated and "continue to register" has been selected, the process returns to step S41, and subsequently, the process of adding the home/workplace, which is a main point, is repeated from the beginning.

Furthermore, in step S51, in a case where the button B72 is not operated and "continue to register" is not selected, the process proceeds to step S52.

In step S52, the long-term important area management unit 202 judges whether or not the button B71 has been operated and "return" has been selected. In step S52, in a case where the button B71 is not operated and "return" is not selected, the process returns to step S50. That is, in a case where neither the button B71 nor the button B72 is pressed and neither "return" nor "continue to registration" is selected, the processes of steps S50 to S52 are repeated, and the image P14, which is the registration completion image, is continuously displayed.

Figure 14:
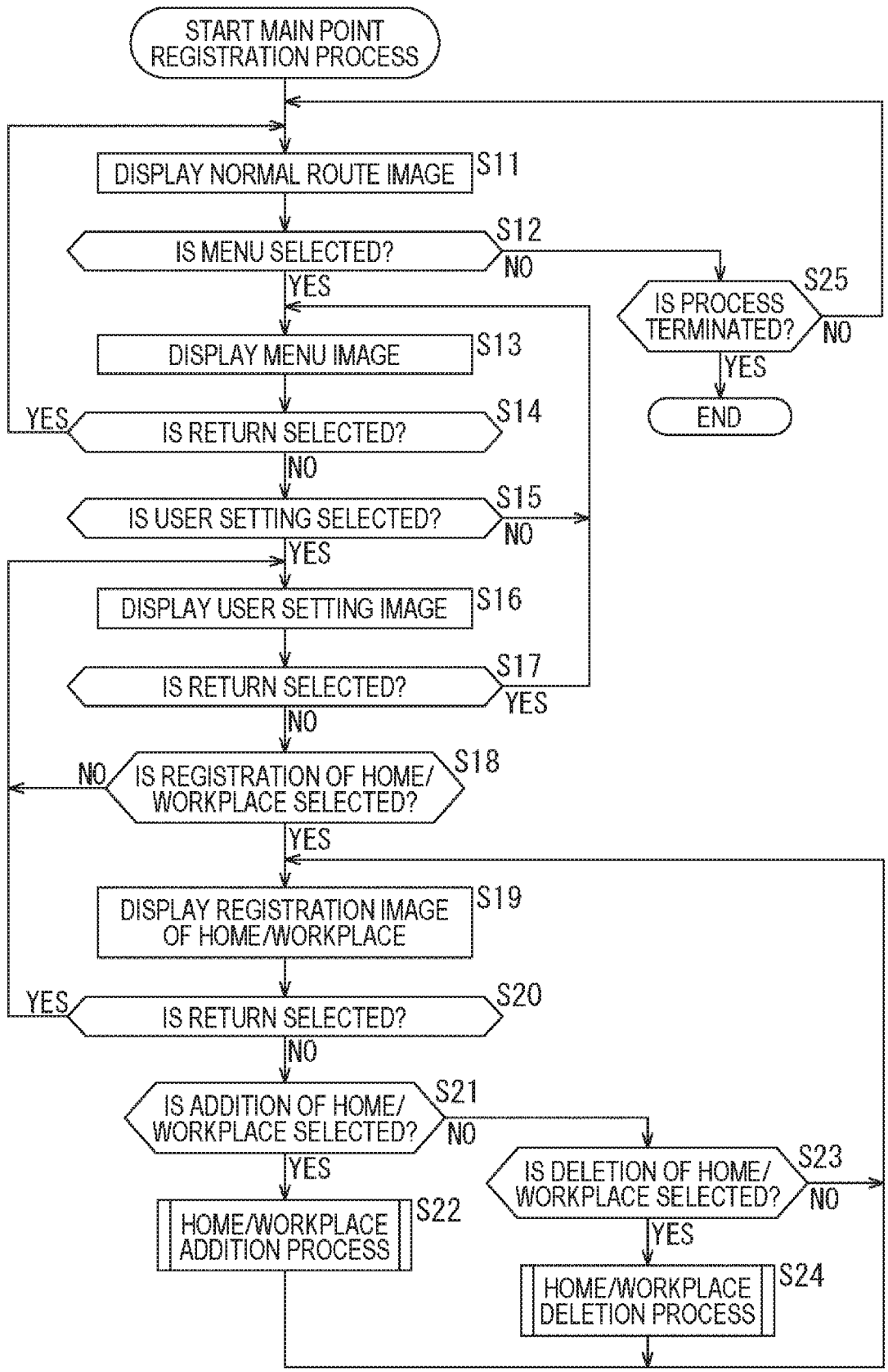
FIG. 14 is a flowchart explaining a main point registration process.

Then, in step S52, in a case where the button B71 is operated and "return" is selected, the home/workplace addition process is terminated, and the process returns to step S19 in FIG. 14.

As a result of the processes described above, the home/workplace is added and registered as a main point to the main point list 211.

<Process of Deleting Home/Workplace>

Figure 18:
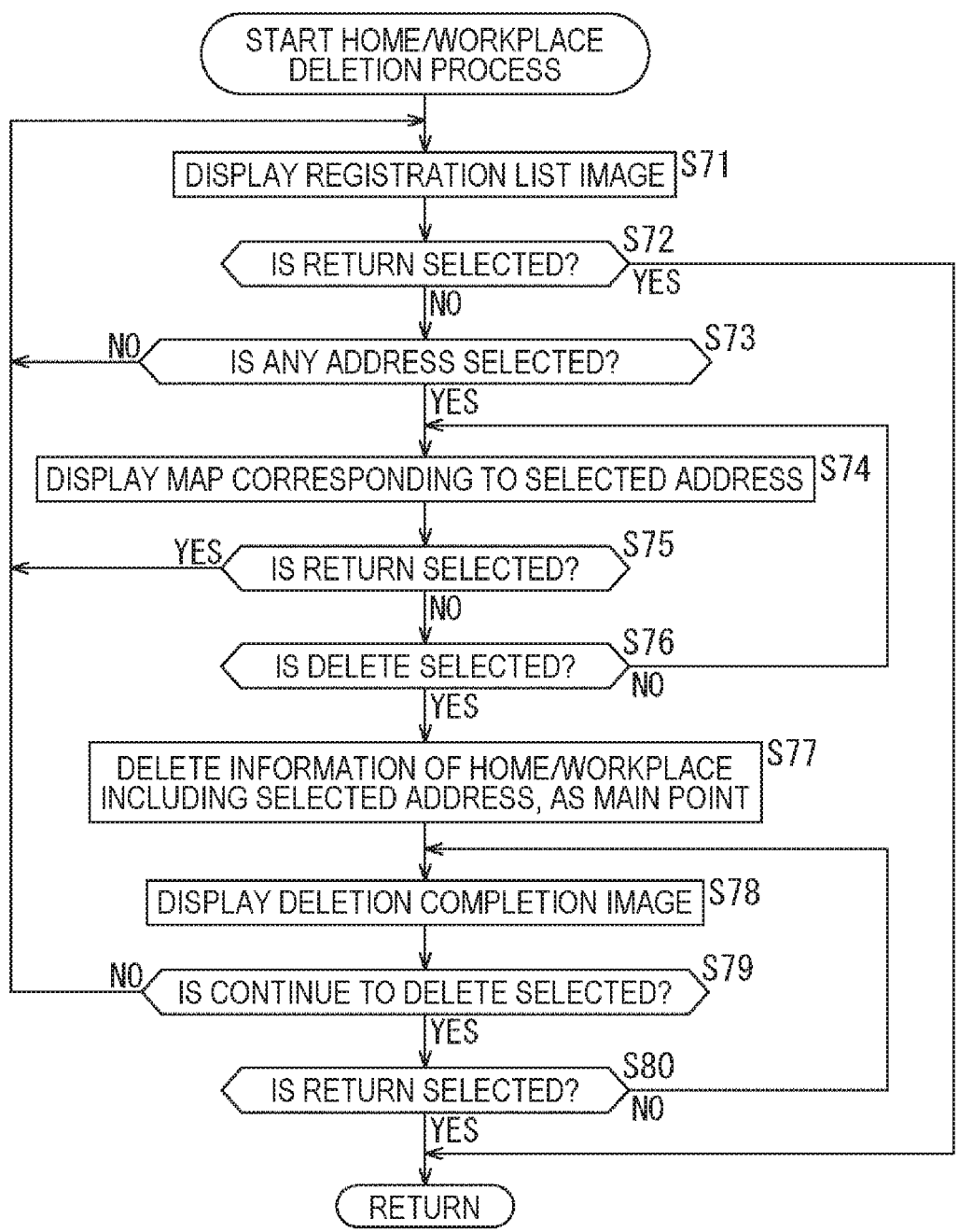
FIG. 18 is a flowchart explaining a home/workplace deletion process.

Next, the process of deleting a home/workplace will be described with reference to the flowchart of FIG. 18.

In step S71, the long-term important area management unit 202 reads information of the home/workplace as the main point registered in the main point list 211 on the display of the output unit 106, creates a registration list image, and displays, for example, an image P21 of FIG. 19.

Figure 21:
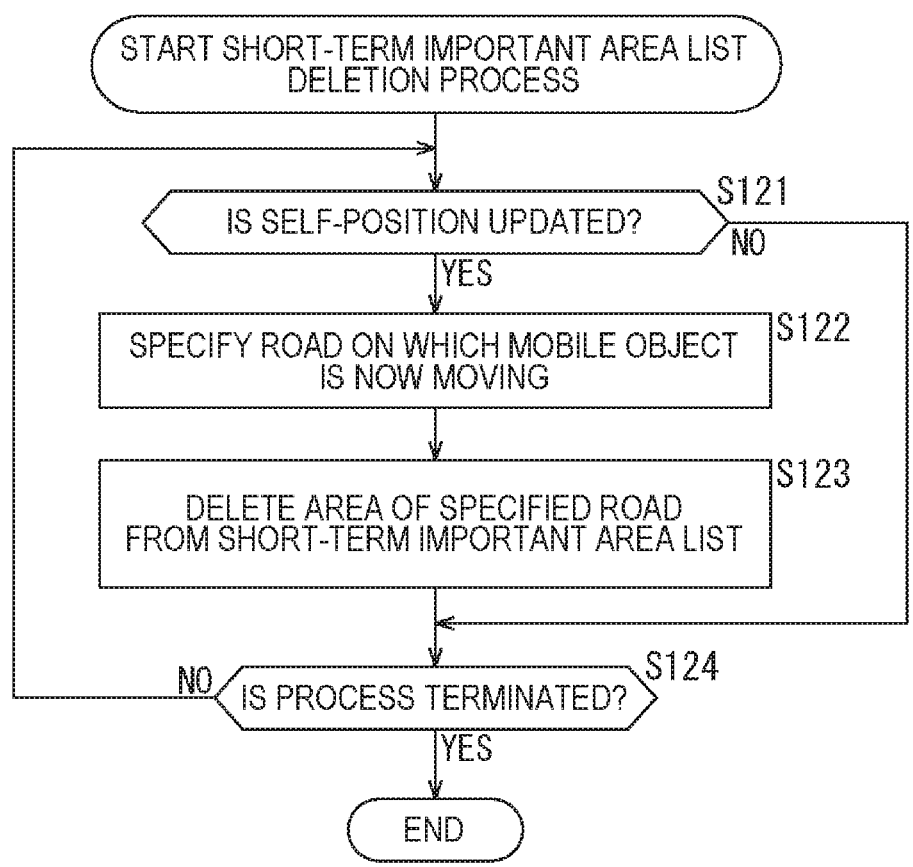
FIG. 21 is a flowchart explaining the short-term important area list deletion process.

The image P21 in FIG. 21 displays buttons B91 to B93 in this order from the top in FIG. 21, as a registration list image.

The button B91 is labeled "X-Y-Z Shinagawa, Tokyo", indicates the address of a main point registered as a home or a workplace, and is operated upon deletion.

The button B92 is labeled "A-B-C, Yokohama, Kanagawa", indicates the address of a main point registered as a home or a workplace, and is operated upon deletion.

The button B93 is labeled "return" and is operated to return the screen to the home/workplace registration screen.

In step S72, the long-term important area management unit 202 judges whether or not the button B93 has been operated and return has been selected. In step S72, in a case where the button B93 is operated and return is selected, the home/workplace deletion process is terminated, and the process returns to step S19 in FIG. 14.

In contrast, in step S72, in a case where return is not selected, the process proceeds to step S73.

In step S73, the long-term important area management unit 202 judges whether or not the button B91 or B92 is operated and any address of the home or the workplace as a main point has been selected as a target to be deleted. In step S73, in a case where one of the buttons B91 and B92 is selected, the process proceeds to step S74. Note that hereinafter the process performed when the button B91 is operated will be described.

In step S74, the long-term important area management unit 202 loads map information stored in the storage unit 109 onto the display of the output unit 106, on the basis of map information corresponding to selected address information, and causes, for example, the map information such as the image P22 in FIG. 19, to be displayed on the display of the output unit 106.

In the image P22 in FIG. 19, an address display column D3 in which the selected address is displayed is provided. In FIG. 19, "X-Y-Z Shinagawa, Tokyo" is displayed. A map image V21 is displayed under the address display column D3. Moreover, buttons B101 and B102 labeled "return" and "delete" are displayed in the lower left part and the lower right part of the map image V21, respectively.

The button B101 is labeled "return" and is operated when returning to display of the image P21, which is the registration list image.

The button B102 is labeled "delete" and is operated when a registered main point such as a home or a workplace, the registered main point being the position information corresponding to the map image V21, is deleted from the main point list 211.

In step S75, the long-term important area management unit 202 judges whether or not the button B101 is pressed and "return" is selected. In step S75, for example, in a case where the button B101 is pressed and "return" is selected, the process returns to step S71, and, for example, the image P21 in FIG. 19 is displayed as the registration list image.

In contrast, in step S75, in a case where the button B101 is not pressed and "return" is not selected, the process proceeds to step S76.

In step S76, the long-term important area management unit 202 judges whether or not the button B102 is pressed and "delete" is selected. In step S76, in a case where the button B102 is not pressed and "delete" is not selected, the process returns to step S74. That is, in a case where neither the button B101 nor the button B102 is pressed and neither "return" nor "delete" is selected, the processes of steps S74 to S76 are repeated, and the map image such as the image P22 in FIG. 19 is continuously displayed.

In a case where "delete" is selected in step S76, the process proceeds to step S77.

In step S77, the long-term important area management unit 202 deletes information of the main point as the home/workplace including the selected address from the long-term important area list 213.

In step S78, the long-term important area management unit 202 displays, as an image indicating completion of deletion, for example, a deletion completion image such as an image P23 in FIG. 19.

In the image P23 of FIG. 19, a confirmation image V22 is provided in the upper row, "'X-Y-Z Shinagawa, Tokyo,' is deleted from home/workplace' is displayed, which indicates that information "X-Y-Z Shinagawa, Tokyo," registered as a main point in the main point list 211 has been deleted. Furthermore, buttons B111 and B112 labeled "return" and "continue to register" are displayed in the lower left part and the lower right part of the confirmation image V22, respectively.

The button B111 is labeled "return", and is operated when the process of deleting home/workplace is terminated and the display is return to display of the image P4, which is the registered image of the home/workplace in FIG. 15.

The button B112 is labeled "continue to delete" and is operated when a new home/workplace is continuously deleted from main points.

In step S79, the long-term important area management unit 202 judges whether or not the button B112 has been operated and "continue to delete" has been selected. In a case where it is considered in step S79 that the button B112 has been operated and "continue to delete" has been selected, the process returns to step S71, and subsequently, the process of deleting the home/workplace, which is a main point, is repeated from the beginning.

Furthermore, in step S79, in a case where the button B112 is not operated and "continue to delete" is not selected, the process proceeds to step S80.

In step S80, the long-term important area management unit 202 judges whether or not the button B111 has been operated and "return" has been selected. In step S80, in a case where the button B111 is not operated and "return" is not selected, the process returns to step S78. That is, in a case where neither the button B111 nor the button B112 is pressed and neither "return" nor "continue to delete" is selected, the processes of steps S78 to S80 are repeated, and the image P23, which is the deletion completion image, is continuously displayed.

Then, in step S80, in a case where the button B111 is operated and "return" is selected, the home/workplace deletion process is terminated, and the process returns to step S19 in FIG. 14.

As a result of the above processes, information selected from information of homes/workplaces registered as main points in the main point list 211 is deleted from the main point list 211.

According to the process described with reference to FIGS. 14 to 19, it is possible to register a main point in the main point list 211 or to delete a main point registered in the main point list 211 according to input operation of the user.

<Short-Term Important Area List Addition Process>

Figure 20:
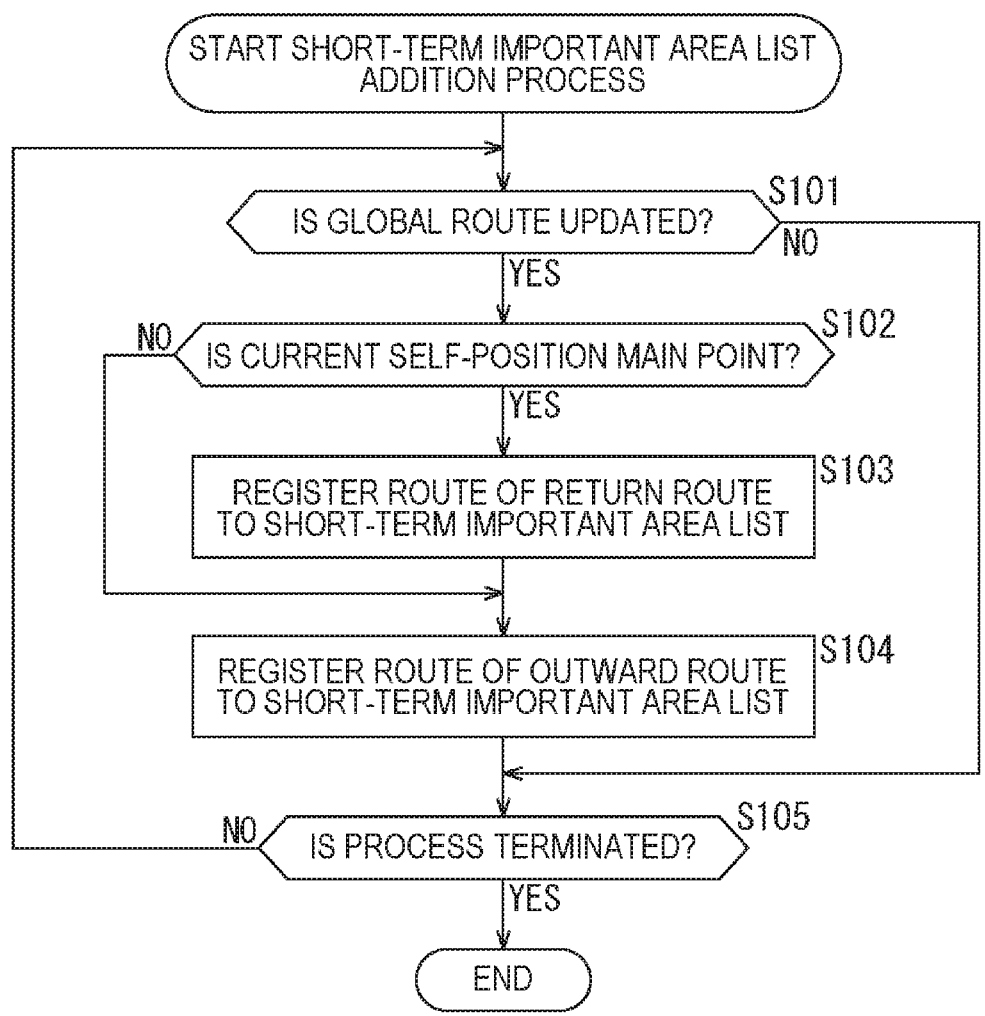
FIG. 20 is a flowchart explaining a short-term important area list addition process.

Next, a short-term important area list addition process will be described with reference to the flowchart in FIG. 20.

In step S101, the short-term important area management unit 201 judges whether or not a global route is newly planned and updated by the global-route planning unit 251 of the route planning unit 161 in the planning unit 134.

In step S101, for example, if a destination is set by the user and the global-route planning unit 251 plans a global route from the current position to the destination, the process proceeds to step S102.

In step S102, the short-term important area management unit 201 accesses the main point list 211 of the long-term important area management unit 202, and judges whether or not the current position is a main point. In a case where it is determined in step S102 that the current position is a main point registered in the main point list 211, the process proceeds to step S103.

In step S103, on the basis of the global route, the short-term important area management unit 201 registers information of the area set to be a return route in the short-term important area list 221.

Note that in a case where the current position is not the main point in step S102, the process in step S103 is skipped.

In step S104, on the basis of the global route, the short-term important area management unit 201 registers information of the area set to be an outward route in the short-term important area list 221.

In step S105, the short-term important area management unit 201 judges whether or not an instruction on termination of operation of the autonomous movement control unit 110 has been given, that is, judges whether or not an instruction on stop of the main power supply of the mobile object 11 has been given. In a case where the instruction on the termination is given, the operation is terminated.

Furthermore, in step S105, if the instruction on the termination is not given, the process returns to step S101.

Moreover, in a case where the global route is not updated in step S101, the processes of steps S102 to S104 are skipped.

That is, every time the global route is planned until the instruction on the termination is given, the road area belonging to the planned global route is registered in the short-term important area list 221 as the short-term important area. Furthermore, in a case where the current position at the timing when the global route is planned is a main point, it is highly likely that the mobile object will return again. Therefore information of the area of the return route in addition to the area of the outward route of the global route is added as the short-term important area and is registered in the short-term important area list 221.

<Short-Term Important Area List Deletion Process>

Next, a short-term important area list deletion process will be described with reference to the flowchart in FIG. 21.

In step S121, the short-term important area management unit 201 judges whether or not the self-position has been updated on the basis of information of the self-position supplied from the self-position estimation unit 132. In a case where it is judged that the self-position has been updated, the process proceeds to step S122.

In step S122, the short-term important area management unit 201 specifies the area of a road where the mobile objects is moving, the area corresponding to the current position.

In step S123, the short-term important area management unit 201 deletes the area of the road where the mobile objects is moving, the area corresponding to the specified current position, from the areas registered in the short-term important area list 221.

In step S124, the short-term important area management unit 201 judges whether or not an instruction on termination of operation of the autonomous movement control unit 110 has been given, that is, judges whether or not an instruction on stop of the main power supply of the mobile object 11 has been given. In a case where the instruction on the termination is given, the operation is terminated.

Furthermore, in step S124, if the instruction on the termination is not given, the process returns to step S121.

Note that in a case where the self-position is not updated in step S121, the processes of steps S122 and S123 are skipped.

That is, every time the self-position is updated until the instruction on the termination is given, the area of the road corresponding to the current self-position is deleted from the areas registered in the short-term important area list 221.

That is, when the global route is planned, the area of the road belonging to the global route is registered in the short-term important area list 221. Moreover, when the mobile object 11 moves according to the global route, the area where the mobile object 11 has passed is deleted from the short-term important area list 221 at the timing when the mobile object 11 sequentially passes the road planned as the global route.

As described above, in the short-term important area list 221, when the global route is planned, the area of the road where the mobile object 11 is going to pass is registered as the short-term important area and deleted when the mobile object 11 has passed.

<Long-Term Important Area List Update Process>

Next, a long-term important area list update process will be described with reference to the flowchart in FIG. 22.

In step S141, the long-term important area management unit 202 accesses the short-term important area list 221 of the short-term important area management unit 201, and judges whether or not the short-term important area list 221 has been updated. In a case where it is judged in step S141 that the short-term important area list 221 has been updated, the process proceeds to step S142.

Note that update of the short-term important area list 221 here means that the global route is updated by, for example, the above-described short-term important area list addition process, and an area of a road on the global route is additionally registered. Therefore, in the process in step S141, judgment may be made on the basis of whether or not the global route has been updated.

In step S142, the long-term important area management unit 202 sets any of the unprocessed short-term important areas among the short-term important areas registered in the short-term important area list 221 to be a short-term important area to be processed.

In step S143, the long-term important area management unit 202 executes a location information update process, registers the short-term important area to be processed as a long-term important area candidate, and manages a score.

<Location Information Update Process>

Figure 23:
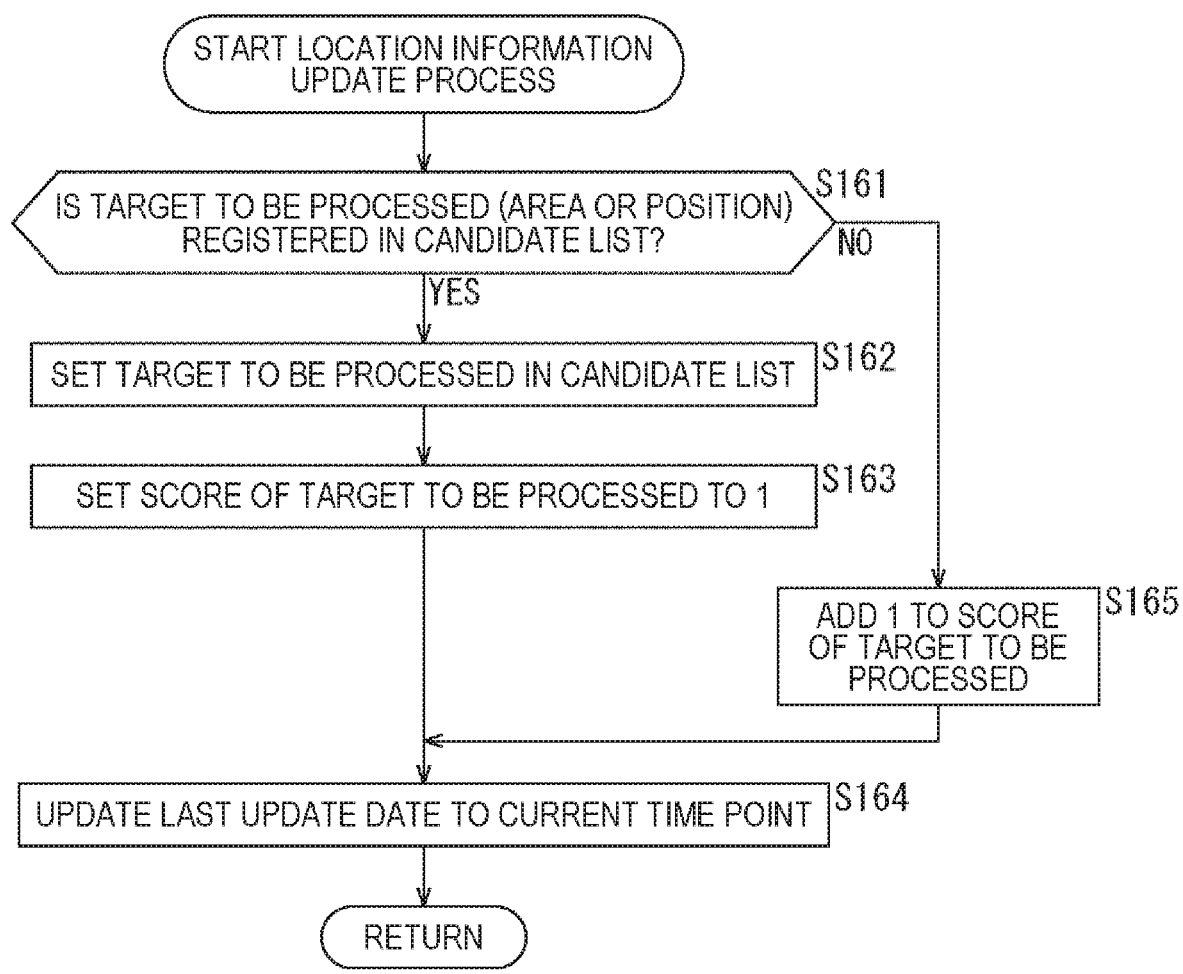
FIG. 23 is a flowchart explaining a location information update process.

Here, a location information update process will be described with reference to the flowchart of FIG. 23.

In step S161, the long-term important area management unit 202 judges whether or not the short-term important area to be processed is registered as a long-term important area candidate in the long-term important area candidate list 214. In step S161, in a case where the short-term important area to be processed is not registered as a long-term important area candidate in the long-term important area candidate list 214, the process proceeds to step S162.

In step S162, the long-term important area management unit 202 registers the short-term important area to be processed as a long-term important area candidate in the long-term important area candidate list 214.

In step S163, the long-term important area management unit 202 sets the score of the long-term important area candidate to be processed registered in the long-term important area candidate list 214 to 1 (initial value).

In step S164, the long-term important area management unit 202 updates the last update date of the long-term important area candidate to the current time point, the long-term important area candidate having been registered in the long-term important area candidate list 214.

In contrast, in step S161, in a case where the short-term important area to be processed has already been registered in the long-term important area candidate list 214, the process proceeds to step S165.

In step S165, the long-term important area management unit 202 adds 1 to the score of the long-term important area candidate registered in the long-term important area candidate list 214, the long-term important area candidate corresponding to the short-term important area to be processed, and the process proceeds to step S164.

As a result of the above processes, the short-term important area registered in the short-term important area list 221 is registered as a long-term important area candidate in the long-term important area candidate list 214. If the short-term important area is registered, the score is added repeatedly thereafter every time the short-term important area is registered to the short-term important area list 221. That is, an area registered in the short-term important area list 221 as a short-term important area is regarded as a long-term important area candidate, and the score is cumulatively added if the registration frequency increases.

Figure 22:
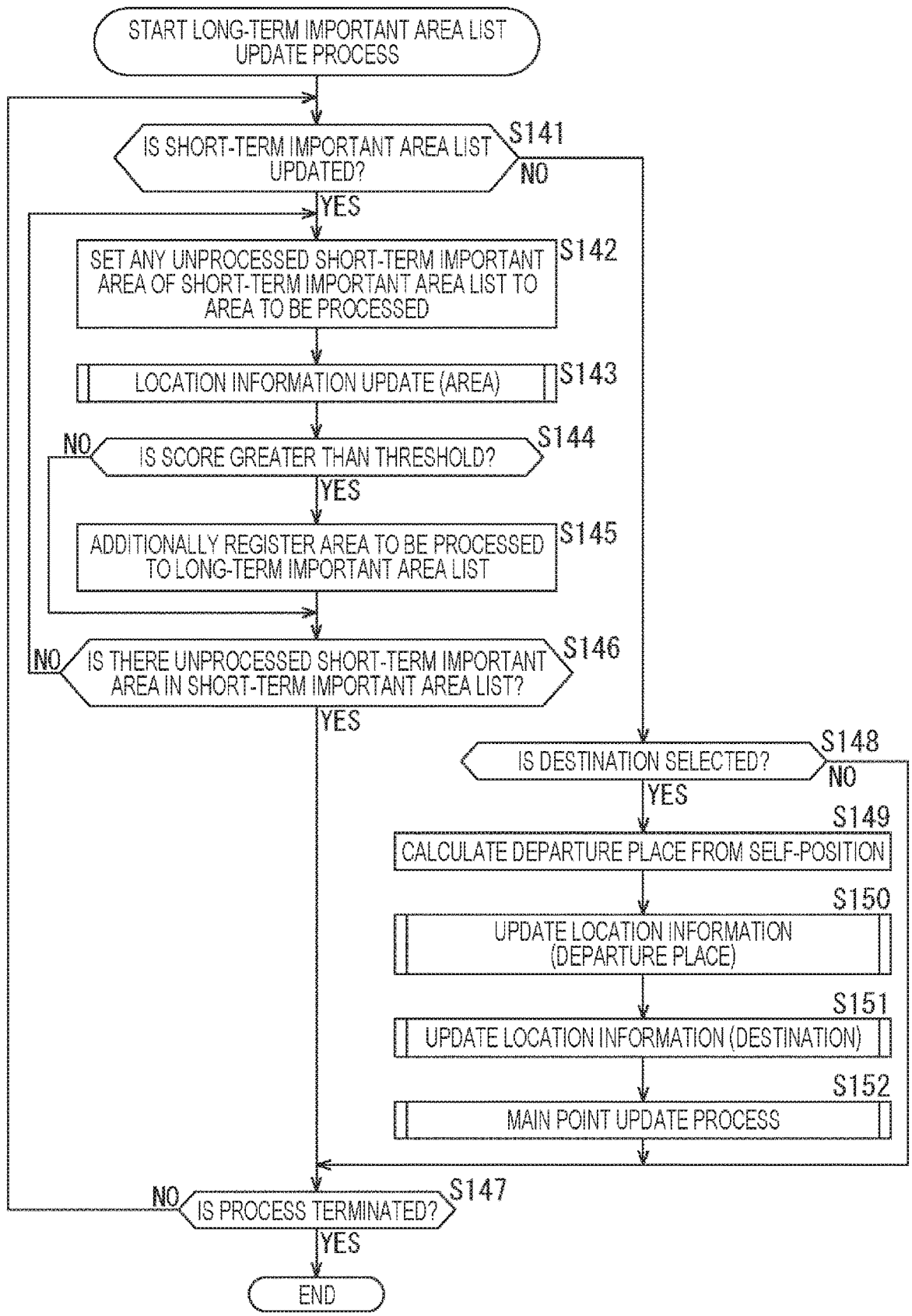
FIG. 22 is a flowchart explaining a long-term important area list update process.

Here, the description returns to the processes of the flowchart in FIG. 22.

In a case where the location information update process is performed in step S143, the process proceeds to step S144.

In step S144, the long-term important area management unit 202 judges whether or not the score of the long-term important area candidate in the long-term important area candidate list 214, the long-term important area candidate corresponding to the short-term important area to be processed, is greater than a predetermined threshold. In step S144, in a case where the score of the long-term important area candidate corresponding to the short-term important area to be processed, is greater than the predetermined threshold, the process proceeds to step S145.

In step S145, the long-term important area management unit 202 considers the long-term important area candidate corresponding to the short-term important area to be processed as a long-term important area, and additionally registers the long-term important area candidate to the long-term important area list 213.

Note that in step S144, in a case where the score of the long-term important area candidate corresponding to the short-term important area to be processed is not greater than the predetermined threshold, the process of step S145 is skipped.

In step S146, the long-term important area management unit 202 judges whether or not there is an unprocessed short-term important area in the short-term important area list 221, and the process returns to step S142 in a case where there is an unprocessed short-term important area. That is, the processes of steps S142 to S146 are repeated until all of the short-term important areas registered in the short-term important area list 221 are processed.

Then, in step S146, in a case where all of the short-term important areas registered in the short-term important area list 221 are subjected to the processes in steps S142 to S146 and it is considered that there is no unprocessed short-term important areas, the process proceeds to step S147.

In step S147, the long-term important area management unit 202 judges whether or not an instruction on termination of operation of the autonomous movement control unit 110 has been given, that is, judges whether or not an instruction on stop of the main power supply of the mobile object 11 has been given. In a case where the instruction on the termination is given, the operation is terminated.

Furthermore, in step S147, if the instruction on the termination is not given, the process returns to step S141.

Moreover, a case where the short-term important area list 221 has not been updated in step S141, the process proceeds to step S148.

In step S148, the long-term important area management unit 202 judges whether or not the input unit 101 has been operated and a destination for planning a global route has been set. In a case where it is considered in step S148 that the destination for planning the global route has been set, the process proceeds to step S149.

In step S149, the long-term important area management unit 202 calculates a departure place from the self-position supplied from the self-position estimation unit 132.

In step S150, the long-term important area management unit 202 executes the location information update process on the departure place. In a case where the departure place is not registered as a main point candidate in the main-point candidate list 212, the long-term important area management unit 202 performs management so that the departure place is registered in the main-point candidate list 212, and the score of the registered main-point candidates is added.

Note that the location information update process is essentially similar to the process described with reference to the flowchart in FIG. 23, and thus description thereof will be omitted. However, the departure place corresponds to the short-term important area to be processed, and the long-term important area candidate and the long-term important area candidate list 214 correspond to the main-point candidate and the main-point candidate list 212.

In step S151, the long-term important area management unit 202 executes the location information update process on the destination. In a case where the destination is not registered as the main place candidate in the main-point candidate list 212, the long-term important area management unit 202 performs management so that the destination is registered in the main-point candidate list 212, and the score of the registered main-point candidates is added.

Note that the location information update process is essentially similar to the process described with reference to the flowchart in FIG. 23, and thus description thereof will be omitted. However, the destination corresponds to the short-term important area to be processed, and the long-term important area candidate and the long-term important area candidate list 214 correspond to the main-point candidate and the main-point candidate list 212.

In step S152, the long-term important area management unit 202 executes a main point update process to register as a main point a main-point candidate whose score is greater than a predetermined threshold to the main point list 211, according to the score of the main-point candidate managed in the main-point candidate list 212.

<Main Point Management Process>

Figure 24:
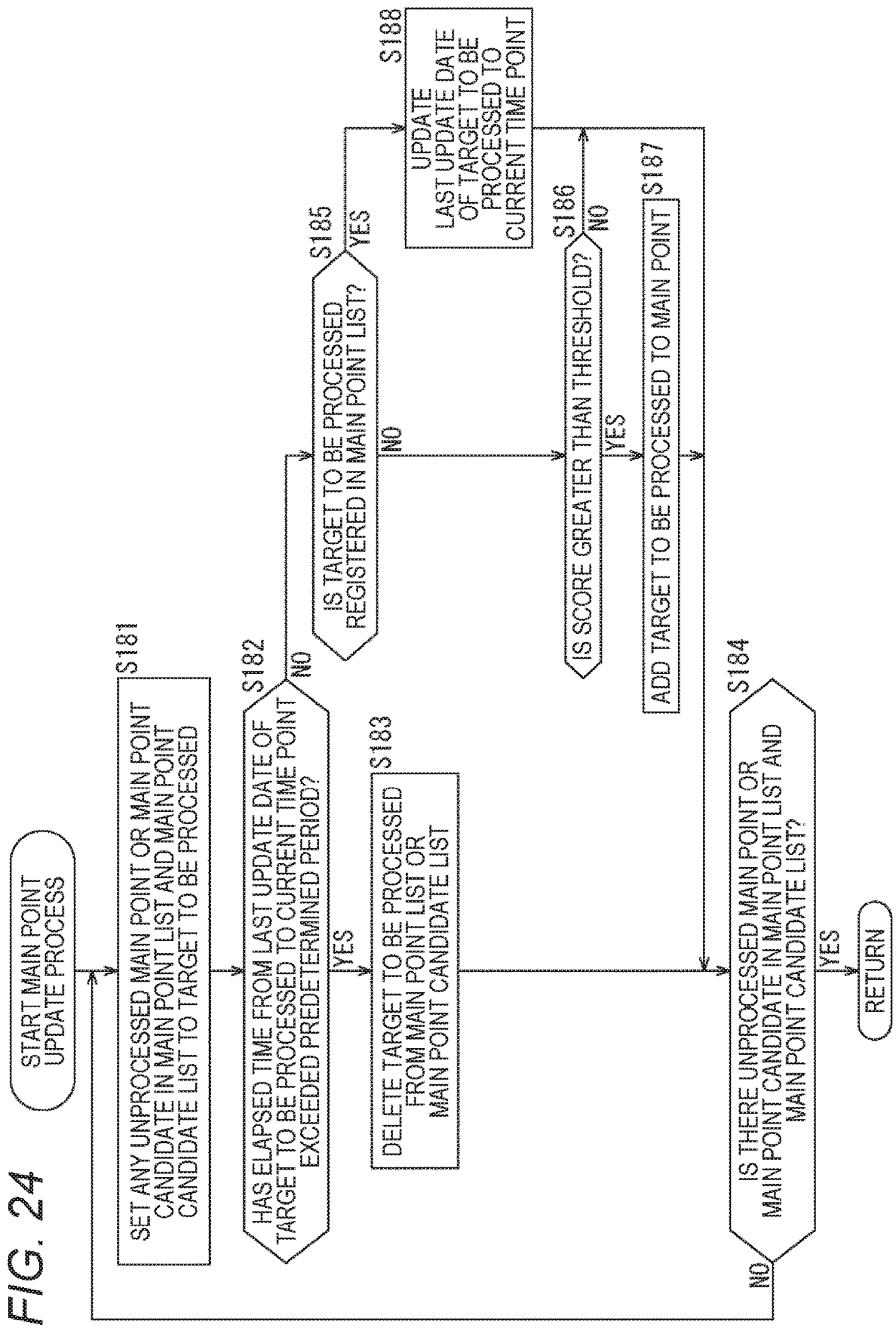
FIG. 24 is a flowchart explaining a main point update process.

Here, a main point management process will be described with reference to the flowchart of FIG. 24.

In step S181, the long-term important area management unit 202 sets, to a target to be processed, one of the unprocessed main point and the unprocessed main-point candidate among the main points registered in the main point list 211 and the main-point candidates registered in the main-point candidate list 212.

In step S182, the long-term important area management unit 202 judges whether or not the elapsed time from the last update date of the main point or the main-point candidate to be processed to the current time point exceeds predetermined time.

In step S182, in a case where the elapsed time from the last update date of the main point or the main-point candidate to be processed to the current time point exceeds the predetermined time, the process proceeds to step S183.

In step S183, the long-term important area management unit 202 deletes the main point or the main-point candidate to be processed from the main point list 211 or the main-point candidate list 212.

In step S184, the long-term important area management unit 202 judges whether or not there is an unprocessed main point or an unprocessed main-point candidate among the main points registered in the main point list 211 and the main-point candidates registered in the main-point candidate list 212.

In step S184, in a case where there is an unprocessed main point or an unprocessed main-point candidate among the main points registered in the main point list 211 and the main-point candidates registered in the main-point candidate list 212, the process returns to step S181.

That is, the processes of steps S181 to S188 are repeated until all the main points registered in the main point list 211 and all the main-point candidates registered in the main-point candidate list 212 have been processed.

Then, in step S184, in a case where it is considered that there is no unprocessed main point or an unprocessed main-point candidate among the main points registered in the main point list 211 and the main-point candidates registered in the main-point candidate list 212, the process is terminated.

Furthermore, in step S182, in a case where the elapsed time from the last update date of the main point or the main-point candidate to be processed to the current time point does not exceed the predetermined time, the process proceeds to step S185.

In step S185, the long-term important area management unit 202 judges whether or not the main point or the main-point candidate to be processed is a main point registered in the main point list 211. In step S185, in a case where the main point or the main-point candidate to be processed is not the main point registered in the main point list 211, that is, in a case where a main-point candidate is to be processed, the process proceeds to step S186.

In step S186, the long-term important area management unit 202 judges whether or not the score of the main-point candidate to be processed is greater than a predetermined threshold. In step S186, in a case where the score of the main-point candidate to be processed is greater than the predetermined threshold, the process proceeds to step S187.

In step S187, the long-term important area management unit 202 registers the main-point candidate to be processed in the main point list 211. Note that the main-point candidate to be processed is deleted from the main-point candidate list 212.

Moreover, in a case where it is determined in step S185 that a main point registered in the main point list 211 is to be processed, the process proceeds to step S188.

In step S188, the long-term important area management unit 202 updates the last update date of the main point to be processed to the current time point.

When the global route is obtained by the above processes, the area on the road on the obtained global route is registered in the short-term important area list 221 as a short-term area.

Then, the short-term important area registered in the short-term important area list 221 is registered in the long-term important area candidate list 214 as a long-term important area candidate, the score of the long-term important area candidate corresponding to the area repeatedly considered to be a short-term important area is sequentially added. If the score exceeds the predetermined threshold, the area is considered as a long-term important area and is registered in the long-term important area list 213.

Furthermore, if a destination is set for planning a global route, the departure place and the destination are registered as main-point candidates in the main-point candidate list 212, the scores of the main point candidates repeatedly set as the departure place and the destination are added. In a case where the score exceeds a predetermined threshold, the main-point candidate is registered as a main point in the main point list 211.

Moreover, the main points registered in the main point list 211 and the main-point candidate registered in the main-point candidate list 212 are deleted from the main point list 211 and the main-point candidate list 212 when a predetermined time has elapsed from the last update date. Furthermore, since the last update date of the main point repeatedly set as the departure place or the destination is updated, the main point is kept registered in the main point list 211.

As a result, when a global route is planned, locations that are highly likely to exist on the planned global route and the area of the roads around the location are registered as a main point candidate and a long-term important area candidate in the main-point candidate list 212 and the long-term important area candidate list 214, the scores of the main-point candidate and the long-term important area candidate are added according to the frequency. When the scores exceed a predetermined threshold, the main-point candidate and the long-term important area candidate are registered as the main point and the long-term important area in the main point list 211 and the long-term important area list 213.

Furthermore, in a case where a predetermined time of a main point has elapsed from the last update date even if the main point is registered in the main point list 211, the main point is deleted from the main point list 211 and the corresponding long-term important area registered in long-term important area list 213 is deleted. Moreover, a main point registered in the main point list 211 is kept registered as long as the main point is frequently used.

As a result, a point frequently used on the global route, which is frequently used, is registered in the main point list 211 as a main point, and can be deleted from the main point list 211 when the use frequency is low, and can be registered or deleted automatically without user input.

<Long-Term Important Area Update Process>

Figure 25:
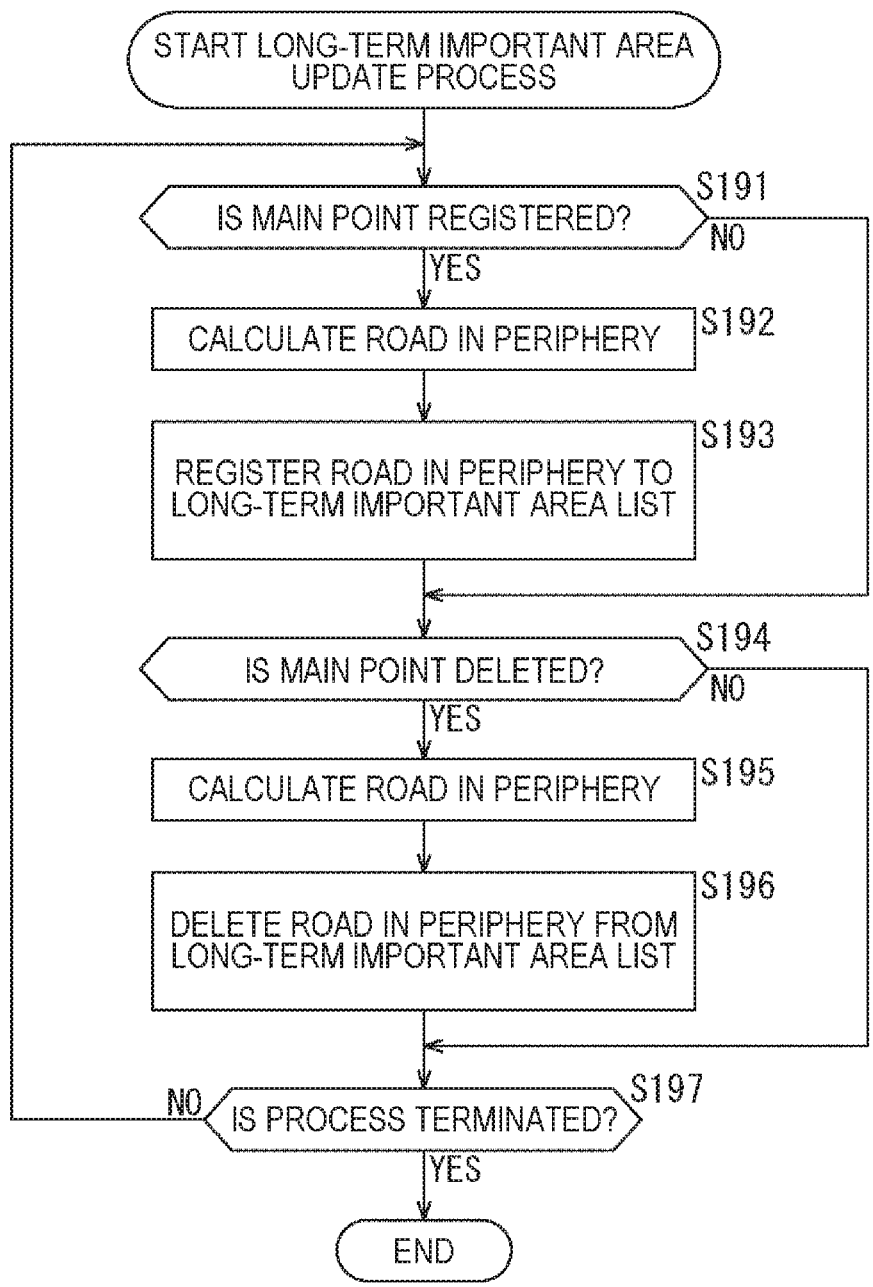
FIG. 25 is a flowchart explaining a long-term important area update process.

Next, a long-term important area update process will be described with reference to the flowchart in FIG. 25.

In step S191, the long-term important area management unit 202 judges whether or not a new main point is registered in the main point list 211. There is a case where a main point is registered in the main point list 211 by user input, and there is a case where a main point is automatically registered in accordance with the frequency of use. In any of the above cases, it is judged whether or not a new main point is registered in the main point list 211.

In a case where it is judged in step S191 that a new main point is registered in the main point list 211, the process proceeds to step S192.

In step S192, the long-term important area management unit 202 calculates a road in the periphery of the registered main point on the basis of road information stored in the storage unit 109.

In step S193, the long-term important area management unit 202 registers the area of the calculated road in the periphery to the long-term important area list 213.

Note that in a case where it is judged in step S191 that a new main point is not registered in the main point list, the processes of steps S192 and S193 are skipped.

In step S194, the long-term important area management unit 202 judges whether or not the main point registered in the main point list 211 has been deleted. There is a case where a main point is deleted from the main point list 211 by user input, and there is a case where a main point is automatically deleted in accordance with the frequency of use. In any of the above cases, it is judged whether or not a new main point is deleted from the main point list 211.

In a case where it is judged in step S194 that a new main point that has been registered is deleted from the main point list 211, the process proceeds to step S195.

In step S195, the long-term important area management unit 202 calculates a road in the periphery of the deleted main point on the basis of map information stored in the storage unit 109.

In step S196, the long-term important area management unit 202 deletes the long-term important area including the information of the area of the calculated road in the periphery from the long-term important area list 213.

In step S197, the long-term important area management unit 202 judges whether or not an instruction on termination of operation of the autonomous movement control unit 110 has been given, that is, judges whether or not an instruction on stop of the main power supply of the mobile object 11 has been given. In a case where the instruction on the termination is given, the operation is terminated.

Furthermore, in step S197, if the instruction on the termination is not given, the process returns to step S191 and the processes from step S191 are repeated.

As a result of the above processes, in a case where a main point is newly registered in the main point list 211, a road in the periphery of the main point to be newly registered is registered as a long-term important area to the long-term important area list 213.

Furthermore, when the registered main point is deleted from the main point list 211, the long-term important area including the area of the road in the periphery of the main point to be deleted is deleted from the long-term important area list 213.

As a result, according to registration or deletion of the main point registered in the main point list 211, the corresponding long-term important area can be registered to or deleted from the long-term important area list 213, and the long-term important area can be managed according to the degree of importance.

<Area Management Process>

Figure 26:
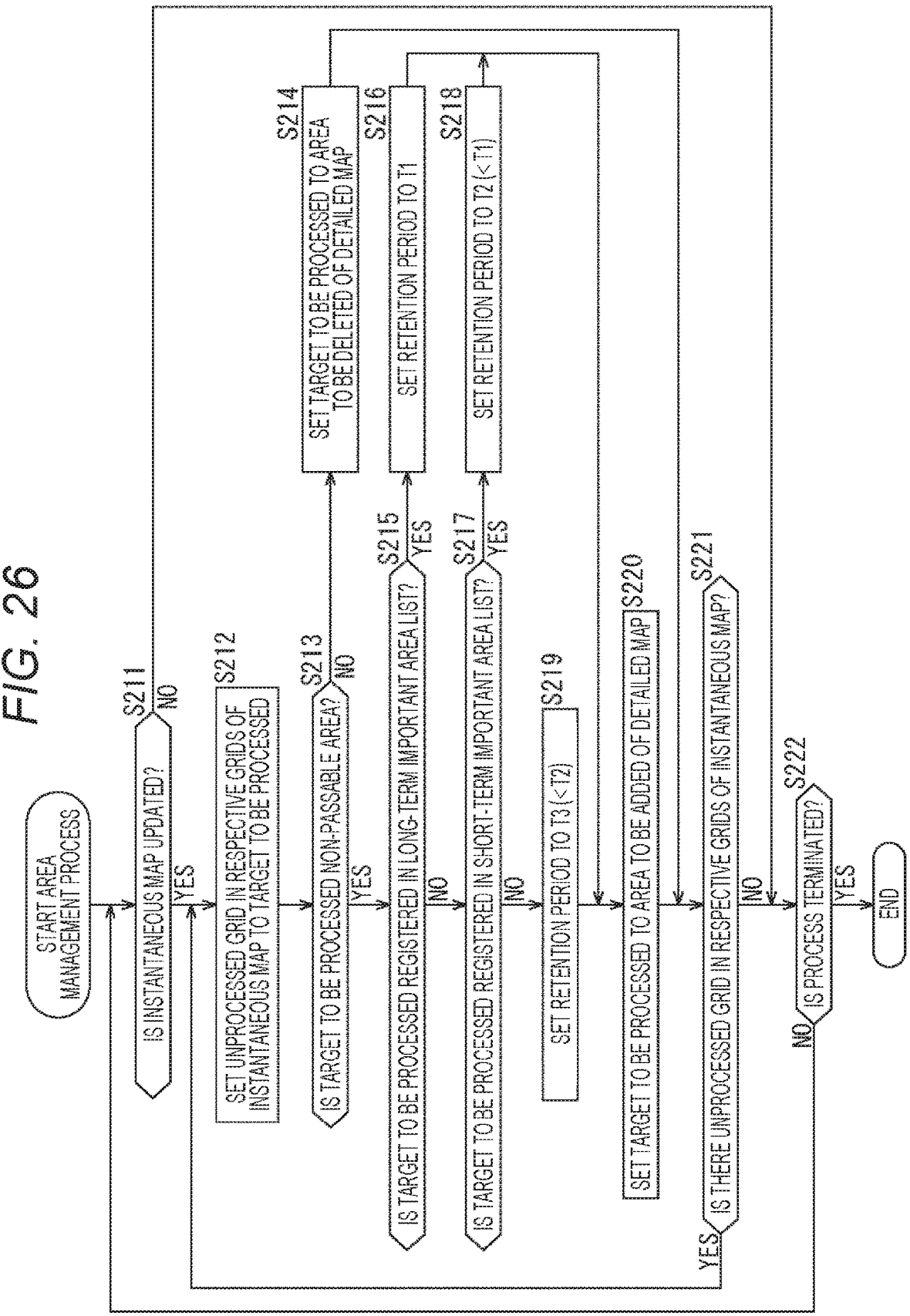
FIG. 26 is a flowchart explaining an area management process.

Next, an area management process will be described with reference to the flowchart of FIG. 26.

In step S211, the area management unit 204 judges whether or not an instantaneous map has been updated and created by an instantaneous-map creation unit 203. That is, it is judged whether or not an instantaneous map is updated and created by the instantaneous-map creation unit 203 on the basis of detection results in the periphery acquired by the data acquisition unit 102 along with movement of the mobile object 11 and detected by the detection unit 131 on the basis of the acquisition results.

In a case where an instantaneous map is updated and created in step S211, the process proceeds to step S212.

In step S212, the area management unit 204 sets an unprocessed grid among the respective grids forming the instantaneous map to be a target to be processed. Note that the description will be given assuming that the instantaneous map and the detailed map are grid maps; however, the instantaneous map and the detailed map may be maps in another format.

In step S213, the area management unit 204 judges whether or not the target to be processed is a non-passable area. In a case where it is judged in step S213 that the target to be processed is not a non-passable area, the process proceeds to step S214.

In step S214, the area management unit 204 sets the area to be processed to an area to be deleted in the detailed map, and outputs the area to the detailed-map management unit 205, and the process proceeds to step S221. That is, in a case where the area to be processed is not a non-passable area, the area to be processed is a passable area, and does not need to be considered when a local route is planned, and it is not necessary to hold a detailed map for the area to be processed. The area to be processed is set as the area to be deleted of the detailed map.

Furthermore, in a case where it is judged in step S213 that the target to be processed is a non-passable area, the process proceeds to step S215.

In step S215, the area management unit 204 accesses the long-term important area list 213 in the long-term important area management unit 202, and judges whether or not the area to be processed is registered as the long-term important area. In step S215, in a case where the area management unit 204 judges that the area to be processed is registered as a long-term important area, the process proceeds to step S216.

In step S216, the area management unit 204 sets the area to be processed to a retention period T1 in the detailed map, and the process proceeds to step S220.

Moreover, in step S215, in a case where the area to be processed is not registered as a long-term important area in the long-term important area list 213, the process proceeds to step S217.

In step S217, the area management unit 204 accesses the short-term important area list 221 in the short-term important area management unit 201, and judges whether or not the area to be processed is registered as a short-term important area. In step S217, in a case where the area to be processed is registered as a short-term important area, the process proceeds to step S218.

In step S218, the area management unit 204 sets the area to be processed to a retention period T2 (<T1) in the detailed map, and the process proceeds to step S220.

Moreover, in step S217, in a case where the area to be processed is not registered as a short-term important area in the short-term important area list 221, the process proceeds to step S219.

In step S219, the area management unit 204 sets the area to be processed to a retention period T3 (<T2) in the detailed map, and the process proceeds to step S220.

In step S220, the area management unit 204 sets the area to be processed to an area to be added of the detailed map in association with the set retention period, and outputs the area to the detailed-map management unit 205.

In step S221, the area management unit 204 judges whether or not there is an unprocessed grid among the respective grids of the instantaneous map. In a case where there exists an unprocessed grid, the process returns to step S212. That is, the processes of steps S212 to S221 are repeated until all the areas set by the respective grids of the instantaneous map have been processed.

Then, in step S221, in a case where there is no unprocessed grid and all the grids have been processed, the process proceeds to step S222.

In step S222, the area management unit 204 judges whether or not an instruction on termination of operation of the autonomous movement control unit 110 has been given, that is, judges whether or not an instruction on stop of a main power supply of the mobile object 11 has been given. In a case where the instruction on the termination is given, the operation is terminated.

Furthermore, in step S222, when the instruction on the termination is not given, the process returns to step S211.

Note that in a case where the instantaneous map is not updated in step S211, the processes of steps S212 to S221 are skipped.

That is, every time the instantaneous map is updated until the instruction on the termination is given, depending on whether an area to be each grid on the instantaneous map is a long-term important area registered in the long-term important area list 213, a short-term important area registered in the short-term important area list 221, or an area not registered in any of them, the areas of the grids are classified into three types of a long-term important area, a short-term important area, or the other areas and are set to areas to be retained as detailed maps of a retention period T1>T2>T3 according to the classification results.

Therefore, the long-term important area that frequently appears every time a global route is set has the highest importance as the area to be held as the detailed map, and thus the longest retention period T1 is set. Furthermore, the retention period T2 (<T1) which is second longest to the long-term important area retention period T1 is set for the short-term important area in the current global route, which is less important than the long-term important area as the area to be retained. Then, the shortest retention period T3 (<T2) is set for an area that is set to neither a long-term important area nor a short-term important area.

As a result, regarding an area of each grid in the instantaneous map, when a global route is set, an area having a high frequency of appearance, that is, an area with high importance, is set to be retained as a detailed map with a long retention period. In contrast, regarding an area of each grid in the instantaneous map, an area having a low frequency of appearance, that is, an area with low importance, is set to be retained as a detailed map with a short retention period. Note that an example in which the types of area classified into three types, that is, a short-term important area, a long-term important area, and the other areas have been described above. However, the types may be classified into three or more types, and the retention periods may be classified into three or more types.

<Detailed Map Update Process>

Figure 27:
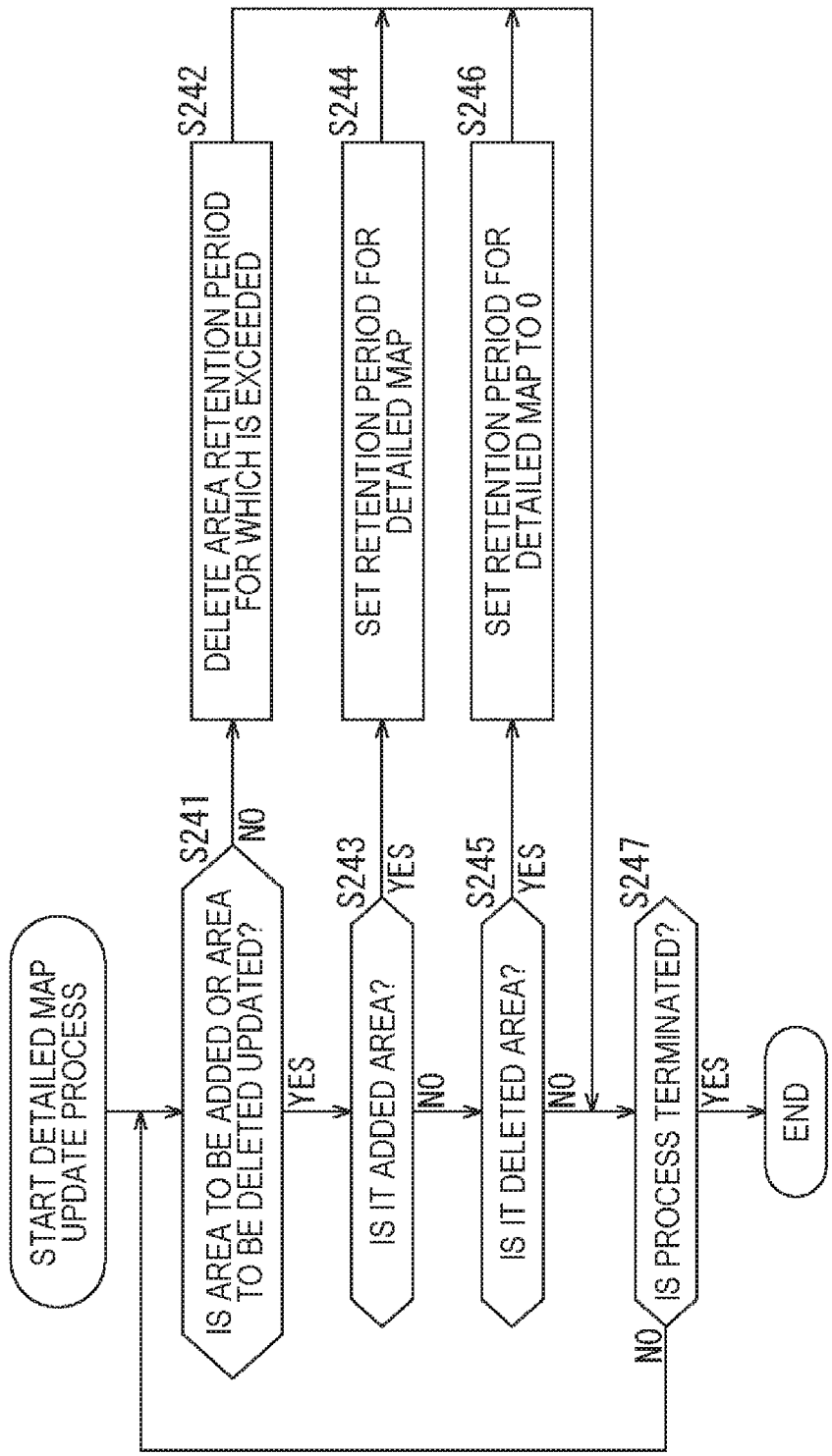
FIG. 27 is a flowchart explaining a detailed map update process.

Next, a detailed map update process will be described with reference to the flowchart of FIG. 27.

In step S241, the detailed-map management unit 205 judges whether or not information of the area to be added or the area to be deleted of the detailed map has been updated. In step S241, for example, in a case where the information of the area to be added or the area to be deleted of the detailed map is updated by the process of step S220 or S214 in FIG. 26, the process proceeds to step S243.

In step S243, the detailed-map management unit 205 judges whether or not the area to be added of the detailed map has been updated. For example, in a case where the area to be added of the detailed map is updated in step S243, the process proceeds to step S244.

In step S244, the detailed-map management unit 205 updates the information of the area to be added and the retention period of the detailed map 231 on the basis of the information of the area to be added of the detailed map that has been supplied.

Furthermore, in a case where it is considered in step S243 that the area to be added of the detailed map 231 is not updated, the process proceeds to step S245.

In step S245, the detailed-map management unit 205 judges whether or not the area to be deleted of the detailed map 231 has been updated. For example, in a case where the area to be deleted of the detailed map 231 is updated in step S245, the process proceeds to step S246.

In step S246, the detailed-map management unit 205 updates to 0 the retention period of the area to be deleted of the detailed map 231 on the basis of the information of the area to be deleted of the detailed map that has been supplied. That is, the retention period is set so that the detailed map is not retained substantially.

In step S247, the area management unit 204 judges whether or not an instruction on termination of operation of the autonomous movement control unit 110 has been given, that is, judges whether or not an instruction on stop of the main power supply of the mobile object 11 has been given. In a case where the instruction on the termination is given, the operation is terminated.

Furthermore, in step S247, when the termination is not instructed, the process returns to step S241.

Moreover, in step S241, in a case where the information of the area to be added and the area to be deleted of the detailed map is not updated, the process proceeds to step S242.

In step S242, the area management unit 204 reads the retention period for each area of the detailed map 231 and deletes the area whose retention period has passed.

As a result of the above processes, retention for each area in the detailed map 231 is managed on the basis of the information of the area to be added or the area to be deleted set in each area in the instantaneous map set in the area management processes performed by the area management unit 204.

As a result, the long-term important area, the short-term important area, and the other areas have longer retention periods in this order and retain detailed maps. Therefore, the more important the area is, the longer the detailed map is retained.

<Action Process>

Figure 28:
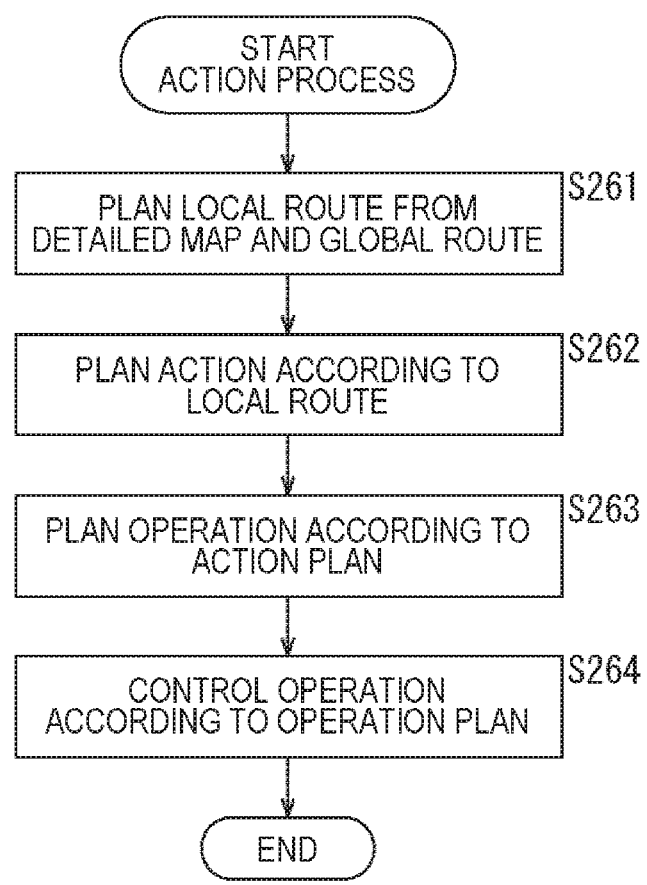
FIG. 28 is a flowchart explaining an action process.

Next, an action process accompanying autonomous movement control of the mobile object 11 will be described with reference to the flowchart of FIG. 28.

In step S261, the local-route planning unit 252 plans a local route on the basis of the detailed map 231 managed by the detailed-map management unit 205 and the global route supplied from the global-route planning unit 251, and outputs the local route to the action planning unit 162.

In step S262, the action planning unit 162 plans the action of the mobile object 11 for safety movement on the local route planned by the local-route planning unit 252 within the planned time, and supplies data indicating the planned action of the mobile object to the operation planning unit 163 and the like.

In step S263, the operation planning unit 163 plans operation of the mobile object to achieve the action planned by the action planning unit 162, and supplies the operation to the operation control unit 135.

In step S264, the operation control unit 135 controls operation of the mobile object 11 on the basis of the operation plan planned by the operation planning unit 163.

As a result of the above-described processes, in the detailed map 231 managed by the detailed-map management unit 205, a relatively long retention period is set and retained for a detailed map including a non-passable area in an area with high importance.

Furthermore, when the destination is set and the global route is set, the area on the global route is considered as a short-term important area and set to have a relatively high importance compared to the importance of the other areas and thus the retention period is set for the area. Therefore, the detailed map is retained according to the schedule accompanying the movement from now on, so that it is possible to achieve planning of an efficient local route.

That is, when the global route is set, each area on the global route is registered in the short-term important area list 221 as a short-term important area. Therefore, even if the parked vehicle 12 as illustrated in FIG. 1 is detected on the outward route traveling in the lane 21*a* on the road 21, by setting in advance a local route of traveling in the lane 21*b* in advance, as indicated by the route R11 indicated by the dotted line on the return route, it is possible to plan a route of efficiently avoiding the parked vehicle 12.

Furthermore, the area set as the short-term important area is registered in the long-term important area candidate list 214 as a long-term important area candidate, and a score is set according to the frequency. If the score is greater than a predetermined threshold, the area is registered in the long-term important area list 213 as a long-term important area and the retention period of the detailed map can be set longer. Therefore, it is possible to efficiently plan a local route in a frequently used route.

Moreover, a point set as a destination or a departure place is registered as a main-point candidate in the main-point candidate list 212. As a result, a score is set according to the frequency, and if the score becomes greater than a predetermined threshold, the point is registered in the main point list 211. Then, the area of the road in the periphery of the point registered in the main point list 211 is regarded as a long-term important area and is managed. Therefore, the retention period of the detailed map in the periphery of a frequently-used main point becomes relatively longer, it is possible to efficiently realize planning of the local route at a frequently-used point.

Furthermore, since a retention period of a detailed map is set relatively shorter for an area other than the main point, the long-term important area, and the short-term important area, the detailed map in the infrequently used area is not retained. Therefore, it is possible to save the data amount of the detailed map to be retained can be reduced.

Moreover, even the points and areas registered as the main points and the long-term important areas are regarded as those not used frequently after a predetermined time has elapsed since the last update date and are deleted from the main point list 211 and the long-term important area list 213. Therefore, the retention period of the detailed map in the corresponding area is shortened, and it is possible to save the data amount of the detailed map to be retained.

In any case, as a result, it is possible to effectively use storage capacity while saving the storage capacity and to efficiently plan a movement route by storing or forgetting (deleting) a past detailed map according to the importance during autonomous movement of a mobile object.

3. Example of Execution by Software

Incidentally, the series of processes described above can be executed by hardware, but can also be executed by software. In a case where the series of processes is executed by software, a program that constitutes the software is installed from a recording medium to a computer built into dedicated hardware or, for example, a general-purpose computer or the like to which various programs are installed so as to be able to execute various functions.

FIG. 29 illustrates a configuration example of a general-purpose computer. This personal computer includes a central processing unit (CPU) 1001. An input/output interface 1005 is connected to the CPU 1001 via a bus 1004. A read only memory (ROM) 1002 and a random access memory (RAM) 1003 are connected to the bus 1004.

An input unit 1006 including an input device such as a keyboard or a mouse by which a user inputs an operation command, an output unit 1007 that outputs a processing operation screen or an image of a processing result to a display device, a storage unit 1008 including a hard disk drive or the like that stores programs and various data, and a communication unit 1009 that includes a local area network (LAN) adapter or the like and that executes a communication process via a network represented by the Internet are connected to the input/output interface 1005. Furthermore, a drive 1010 that reads and writes data from and to a removable medium 1011 such as a magnetic disc (including a flexible disc), an optical disc (including (a compact disc-read only memory (CD-ROM), a digital versatile disc (DVD), a magneto-optical disc (including a Mini Disc (MD)), a semiconductor memory, or the like is connected.

The CPU 1001 executes various processes according to a program stored in the ROM 1002, or a program read from a removable medium 1011 such as a magnetic disc, an optical disc, a magneto-optical disc, a semiconductor memory, or the like, installed in the storage unit 1008, and is loaded from the storage unit 1008 into the RAM 1003. The RAM 1003 also appropriately stores data or the like necessary for the CPU 1001 to execute various processes.

In the computer configured as described above, for example, the CPU 1001 loads the program stored in the storage unit 1008 into the RAM 1003 via the input/output interface 1005 and the bus 1004 and executes the program, and thus the above-described series of processes is performed.

The program executed by the computer (CPU 1001) can be provided by being recorded on, for example, the removable medium 1011 as a package medium or the like. Furthermore, the program can be provided via a wired or wireless transmission medium such as a local area network, the Internet, or digital satellite broadcasting.

In the computer, the program can be installed in the storage unit 1008 via the input/output interface 1005 by inserting the removable medium 1011 into the drive 1010. Furthermore, the program can be received by the communication unit 1009 via a wired or wireless transmission medium and can be installed in the storage unit 1008. In addition, the program can be installed in advance into the ROM 1002 or the storage unit 1008.

Note that the program executed by the computer may be a program that performs processes in chronological order according to the order described in the present specification, or may be a program that performs process in parallel, or at necessary timing, such as when a call is made.

Figure 4:
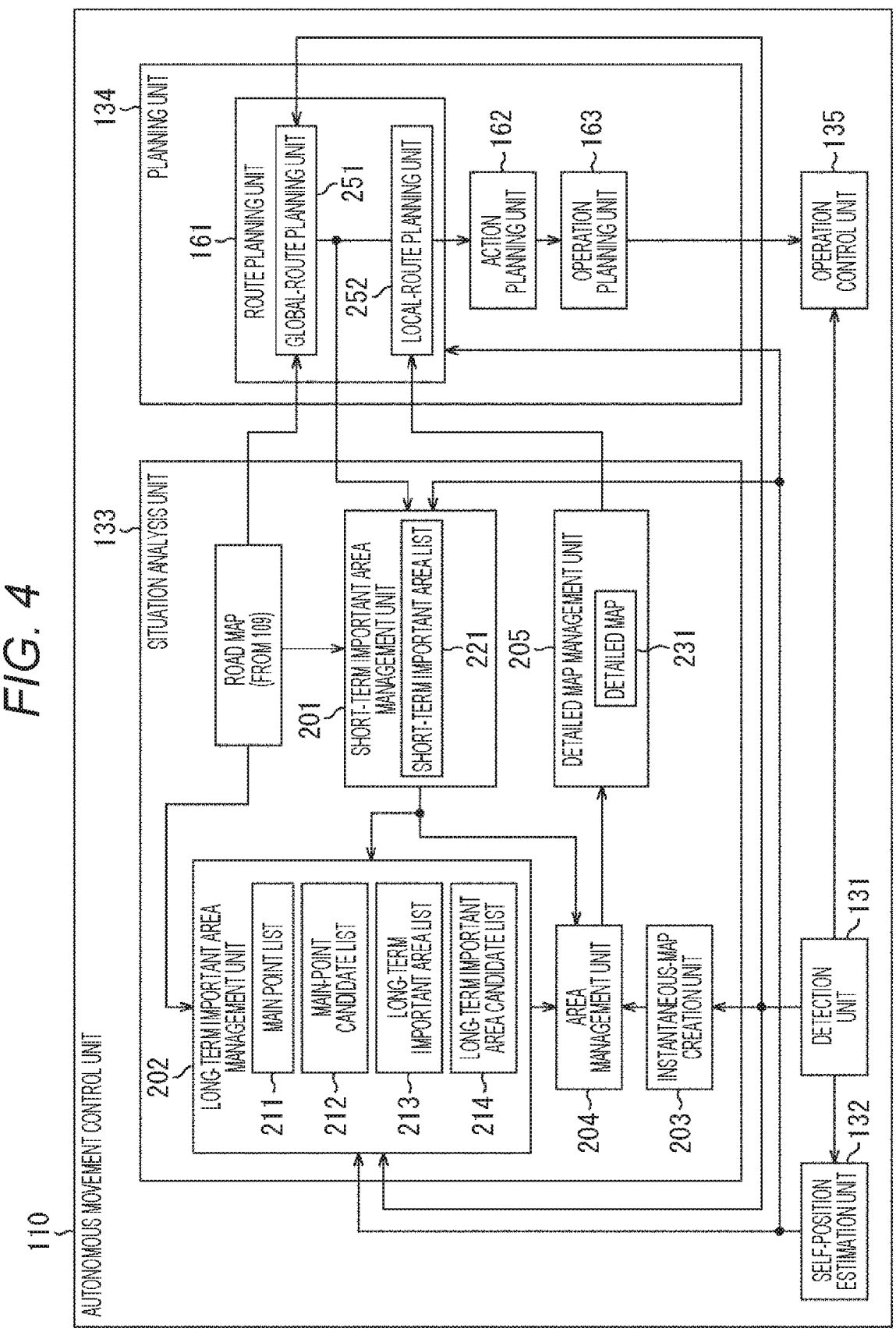
FIG. 4 is a diagram illustrating a detailed configuration example around a situation analysis unit and a planning unit in FIG. 3.

Note that the function of the autonomous movement control unit 110 in FIGS. 3 and 4 is realized by the CPU 1001 in FIG. 29. Furthermore, the storage unit 1008 in FIG. 29 realizes the storage unit 109 in FIG. 3.

In addition, in the present Description, a system means a set of a plurality of constituents (devices, modules (components), or the like), and it does not matter whether or not all the constituents are in the same case. Therefore, each of a plurality of devices housed in separate cases and connected via a network, and one device in which a plurality of modules is housed in one case are a system.

Note that the embodiments of the present disclosure are not limited to the above-described embodiments, and various modifications can be made without departing from the scope of the present disclosure.

For example, the present disclosure can adopt a configuration of cloud computing in which one function is shared and processed jointly by a plurality of devices via a network.

Furthermore, each step described in the above-described flowchart can be executed by one device, or can be shared and executed by a plurality of devices.

Moreover, in a case where a plurality of processes is included in one step, the plurality of processes included in the one step can be shared and executed by a plurality of devices in addition to being executed by one device.

Note that the present disclosure can also be configured as follows.

<1> A control device that controls movement of a mobile object, the control device including
a global-route planning unit that plans a global route to a destination, and
a map storage unit that retains a map of an area with high importance in an area on the global route for a retention period according to the degree of the importance.

<2> The control device according to <1>,
in which the area with the high importance is an area having outside information that affects planning of a route on which the mobile object moves.

<3> The control device according to <2> further including
a first important area management unit that sets an entire area on the global route to a first important area in a case where the global route is planned,
in which the map storage unit retains a map of an area that has the outside information and that is the first important area for a first retention period.

<4> The control device according to <3>,
in which the map storage unit retains a map of a second important area with higher importance than importance of the first important area, the second important area being an area having the outside information, for a second retention period longer than the first retention period.

<5> The control device according to <4>,
in which the map storage unit stores a map of an area that is an area having the outside information, and is neither the first important area nor the second important area for a third retention period shorter than the first retention period.

<6> The control device according to <5>,
in which the first important area management unit registers the entire area on the global route as a first important area in a first important area list in a case where the global route is planned,
the control device further includes a second important area management unit that registers the first important area registered in the first important area list as a second important area candidate which is a candidate of a second important area with higher importance than the importance of the first important area in a second important area candidate list,
the second important area management unit adds a score of the second important area candidate according to frequency at which the second important area candidate registered in the second important area candidate list is registered as the first important area in the first important area list as a result of the global route being planned, and registers the second important area candidate as the second important area in a second important area list in a case where the score is greater than a predetermined threshold, and
the map storage unit retains a map of the second important area which is an area having the outside information and registered in the second important area list for a second retention period longer than the first retention period.

<7> The control device according to <6>,
in which the second important area management unit sets an area in a periphery of a main point which is a point frequently used by a user as the second important area, and registers the area in the periphery of the main point in the second important area list, in a case where the main point which is the point frequently used by the user is set.

<8> The control device according to <7>,
in which the second important area management unit registers the destination and a departure place according to a self-position of the mobile object as main-point candidates which are candidates of the main point in a main-point candidate list, adds a score of a corresponding main point candidate according to frequency at which the destination and the departure place corresponding to the main-point candidates registered in the main-point candidate list are set as a result of the global route being planned, registers the corresponding main-point candidate as the main point in the main point list in a case where the score is greater than a predetermined threshold, and sets an area in a periphery of the main point to the second important area and registers the area in the periphery of the main point in the second important area list in a case where the main point is registered in the main point list.

<9> The control device according to <8>,
in which the second important area management unit registers a current time point as a last update date and deletes the main point and the main point candidate at which predetermined time has passed from the last update date from the main point list and the main-point candidate list in a case where the main point candidate is registered in the main-point candidate list and in a case where the main point is registered in the main point list, and deletes the second important area including an area in a periphery of a main point to be deleted, the main point being registered in the main point list, from the second important area list in a case where the main point registered is deleted from the main point list.

<10> The control device according to <7>,
in which the first important area management unit sets the entire area of an outward route on the global route to the first important area in a case where the global route is planned.

<11> The control device according to <7>,
in which the first important area management unit sets the entire area of an outward route and a return route on the global route to a first important area if the current self-position is the main point in a case where the global route is planned.

<12> The control device according to any one of <1> to <11> further including
a local-route planning unit that plans a local route on the basis of the map stored by the map storage unit and the global route.

<13> The control device according to <12> further including
an action plan creation unit that creates an action plan on the basis of the local route, and
a control unit that controls operation of the mobile object on the basis of an action plan created by the action plan creation unit.

<14> The control device according to <2>,
in which the area having outside information that affects planning of a route on which the mobile object moves is an area where at least one of private land, an area where a car can be parked, an obstacle, a construction area, an accident, a pedestrian zone, a non-passable lane, a parked vehicle, construction, an accident, scattered cargo, an entrance/exit for a construction vehicle, a street stall, or a stand exists.

<15> A control method of a control device that controls movement of a mobile object, the method including:
a global route planning process of planning a global route to a destination; and
a map storage process of retaining a map of an area with high importance in an area on the global route, for a retention period according to a degree of the importance.

<16> A program for causing a computer that controls a control device which controls movement of a mobile object to function as
a global-route planning unit that plans a global route to a destination, and a map storage unit that retains a map of an area with high importance in an area on the global route for a retention period according to the degree of importance.

<17> A mobile object including
a global-route planning unit that plans a global route to a destination,
a map storage unit that retains a map of an area with high importance in an area on the global route for a retention period according to the degree of importance,
a local-route planning unit that plans a local route on the basis of the map stored by the map storage unit and the global route,
an action plan creation unit that creates an action plan on the basis of the local route, and
a control unit that controls operation of the mobile object on the basis of the action plan created by the action plan creation unit.

REFERENCE SIGNS LIST 11, 12 Mobile object (Vehicle)
21 Road
21a to 21c Lane
22 Road
102 Data acquisition unit
105 Output control unit
106 Output unit
107 Drive-system control unit
108 Drive-system system
110 Autonomous movement control unit
131 Detection unit
132 Self-position estimation unit
133 Situation analysis unit
134 Planning unit
135 Operation control unit
161 Route planning unit
162 Action planning unit
163 Operation planning unit
201 Short-term important area management unit
202 Long-term important area management unit
203 Instantaneous-map creation unit
204 Area management unit
205 Detailed-map management unit
211 Main point list
212 Main-point candidate list
213 Long-term important area list
214 Long-term important area candidate list
221 Short-term important area list
231 Detailed map

The invention claimed is:

1. A control device that controls movement of a mobile object, the control device comprising:
a global-route planning unit configured to plan a global route to a destination; and
a map storage unit configured to:
retain a map of a first important area in an area on the planned global route for a first retention period; and
retain a map of a second important area for a second retention period, wherein
the second important area has higher importance than the first important area, and
the second retention period is longer that the first retention period.

2. The control device according to claim 1, wherein each of the first important area and the second important area is an area having outside information that affects planning of a local route, and the mobile object moves on the local route associated with the global route.

3. The control device according to claim 2, further comprising a first important area management unit configured to set the area on the global route to the first important area.

4. The control device according to claim 3, wherein
the map storage unit is further configured to store a map of a specific area for a third retention period shorter than the first retention period, and
the specific area is different from the first important area and the second important area.

5. The control device according to claim 4, wherein
the first important area management unit is further configured to register the first important area in a first important area list,
the control device further comprises:
a second important area management unit configured to:
register the first important area registered in the first important area list as a second important area candidate in a second important area candidate list, wherein the second important area candidate is a candidate of the second important area;
add a score of the registered second important area candidate based on a frequency of the registration of the second important area candidate in the second important area candidate list; and
register the second important area candidate as the second important area in a second important area list based on the score is greater than a first threshold number, and
the map storage unit is further configured to retain the map of the second important area registered in the second important area list for the second retention period.

6. The control device according to claim 5, wherein the second important area management unit is further configured to:
set an area in a periphery of a main point as the second important area, wherein the main point is frequently used by a user; and
register the set area in the periphery of the main point in the second important area list.

7. The control device according to claim 6, wherein the second important area management unit is further configured to:
register the destination and a departure place, based on a self-position of the mobile object, as a plurality of main-point candidates, wherein each of the plurality of main-point candidates is a candidate of the main point in a main-point candidate list,
add a score of a corresponding main-point candidate of the plurality of main-point candidates based on a frequency of the registration of the destination and the departure place,
register the corresponding main-point candidate as the main point in a main point list based on the score of the corresponding main-point candidate is greater than a second threshold number, and
register the area in the periphery of the main point in the second important area list based on the registration of the main point in the main point list.

8. The control device according to claim 7, wherein the second important area management unit is further configured to:

register a current time point of the registration of the main point and the corresponding main-point candidate as a last update date;
delete the main point and the corresponding main-point candidate based on an elapse of a threshold time from the last update date; and
delete the second important area as the area in the periphery of the main point based on the deletion of the registered main point.

9. The control device according to claim 6, wherein the first important area management unit is further configured to set an area of an outward route on the global route to the first important area.

10. The control device according to claim 6, wherein the first important area management unit is further configured to set an area of an outward route and a return route on the global route to the first important area, based on a current self-position of the mobile object is the main point.

11. The control device according to claim 1, further comprising a local-route planning unit configured to plan a local route based on the retained map of one of the first important area or the second important area and the planned global route.

12. The control device according to claim 11, further comprising:
an action plan creation unit configured to create an action plan based on the planned local route; and
a control unit configured to control an operation of the mobile object based on the created action plan.

13. The control device according to claim 2, wherein at least one of the first important area or the second important area includes at least one of a private land, a parking area, an obstacle, a construction area, an accident, a pedestrian zone, a non-passable lane, a parked vehicle, a scattered cargo, an entrance/exit for a construction vehicle, a street stall, or a stand.

14. A control method, comprising:
in a control device that controls movement of a mobile object:
planning a global route to a destination;
retaining a map of a first important area in an area on the planned global route for a first retention period; and
retaining a map of a second important area for a second retention period, wherein
the second important area has higher importance than the first important area, and
the second retention period is longer that the first retention period.

15. A non-transitory computer-readable medium having stored thereon computer-executable instructions which, when executed by a computer, cause the computer to execute operations, the operations comprising:
planning a global route to a destination;
retaining a map of a first important area in an area on the planned global route for a first retention period; and
retaining a map of a second important area for a second retention period, wherein
the second important area has higher importance than the first important area, and
the second retention period is longer that the first retention period.

16. A mobile object, comprising:
a global-route planning unit configured to plan a global route to a destination;
a map storage unit configured to:
retain a map of a first important area in an area on the planned global route for a first retention period; and retain a map of a second important area for a second retention period, wherein
the second important area has higher importance than the first important area, and
the second retention period is longer that the first retention period;
a local-route planning unit configured to plan a local route based on the retained map of one of the first important area or the second important area, and the planned global route;
an action plan creation unit configured to create an action plan based on the planned local route; and
a control unit configured to control an operation of the mobile object based on the created action plan.

* * * * *